United States Patent
Kitagawa et al.

(10) Patent No.: US 11,153,490 B2
(45) Date of Patent: Oct. 19, 2021

(54) IMAGE CAPTURING DEVICE, IMAGE CAPTURING METHOD, AND PROGRAM

(71) Applicant: FUJIFILM Corporation, Tokyo (JP)

(72) Inventors: Junya Kitagawa, Saitama (JP); Koichi Tanaka, Saitama (JP); Fuminori Irie, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/133,699

(22) Filed: Dec. 24, 2020

(65) Prior Publication Data

US 2021/0120180 A1     Apr. 22, 2021

Related U.S. Application Data

(63) Continuation of application No. PCT/JP2019/028843, filed on Jul. 23, 2019.

(30) Foreign Application Priority Data

Aug. 30, 2018 (JP) .............................. JP2018-161647
Nov. 26, 2018 (JP) .............................. JP2018-220605

(51) Int. Cl.
*H04N 5/232*     (2006.01)
*G01K 1/14*      (2021.01)

(52) U.S. Cl.
CPC ........... *H04N 5/23287* (2013.01); *G01K 1/14* (2013.01)

(58) Field of Classification Search
CPC ........... H04N 5/23287; H04N 5/23258; H04N 5/23209; H04N 5/23267; H04N 5/23229;

(Continued)

(56) References Cited

U.S. PATENT DOCUMENTS 8,395,672 B2 * 3/2013 Hayashi ................. G03B 17/00
                                                     348/208.99
9,179,068 B2 * 11/2015 Ikeda .................. H04N 5/23258

(Continued)

FOREIGN PATENT DOCUMENTS

CN     102917168 A     2/2013
CN     104185812 A     12/2014

(Continued)

OTHER PUBLICATIONS

International Search Report issued in PCT/JP2019/028843; dated Oct. 21, 2019.

(Continued)

*Primary Examiner* — Pritham D Prabhakher
(74) *Attorney, Agent, or Firm* — Studebaker & Brackett PC

(57) ABSTRACT

An image capturing device includes: an imaging lens; an image capturing device main body including an imaging element that captures an optical image transmitting through the imaging lens; a first correction unit that performs correction of an image shake by a correction lens; and a second correction unit that performs correction of the image shake by the image capturing device main body. The image capturing device performs a control of causing the first correction unit and the second correction unit to share and correct the image shake and calculates a correction amount of each of the first correction unit and the second correction unit according to at least one of a temperature of the imaging lens or a temperature of the image capturing device main body in a case where correction of the image shake is performed by the first correction unit and the second correction unit.

20 Claims, 13 Drawing Sheets

(58) Field of Classification Search
CPC ............. H04N 5/2254; H04N 5/23254; H04N 5/23261; H04N 5/23264; G01K 1/14; G01K 13/00; G03B 17/14; G03B 5/00; G03B 2217/005; G03B 2205/0015; G02B 27/646; G06T 7/2053
USPC ...................................................... 348/208.1
See application file for complete search history.

(56) References Cited

U.S. PATENT DOCUMENTS

| | | | | |
|---|---|---|---|---|
| 9,613,430 | B2* | 4/2017 | Tsuchiya | H04N 5/23258 |
| 10,169,752 | B2* | 1/2019 | Katsumura | G06K 9/4652 |
| 10,244,174 | B2* | 3/2019 | Mukunashi | H04N 5/23261 |
| 10,511,775 | B2* | 12/2019 | Imanishi | H04N 5/23254 |
| 2013/0004151 | A1* | 1/2013 | Wakamatsu | H04N 5/23287 396/55 |
| 2014/0002679 | A1* | 1/2014 | Ikeda | H04N 5/23264 348/208.5 |
| 2014/0354834 | A1 | 12/2014 | Narita | |
| 2014/0379103 | A1 | 12/2014 | Ishikawa et al. | |
| 2015/0281581 | A1 | 10/2015 | Sakurai et al. | |
| 2015/0309329 | A1 | 10/2015 | Shibata | |
| 2016/0014341 | A1* | 1/2016 | Miyahara | G03B 5/00 348/208.11 |
| 2016/0173781 | A1 | 6/2016 | Tsuchiya | |
| 2016/0269637 | A1* | 9/2016 | Shibata | H04N 5/23258 |
| 2017/0309002 | A1 | 10/2017 | Koyano | |
| 2018/0220074 | A1* | 8/2018 | Mukunashi | H04N 5/23287 |
| 2018/0343393 | A1* | 11/2018 | Maede | G03B 5/02 |
| 2019/0260936 | A1 | 8/2019 | Imanishi | |
| 2020/0195849 | A1* | 6/2020 | Byun | G03B 5/04 |

FOREIGN PATENT DOCUMENTS

| | | |
|---|---|---|
| CN | 104219436 A | 12/2014 |
| CN | 105007406 A | 10/2015 |
| CN | 105704364 A | 6/2016 |
| CN | 107306334 A | 10/2017 |
| JP | 2015-194711 A | 11/2015 |
| JP | 2016-114792 A | 6/2016 |
| JP | 2017-195516 A | 10/2017 |
| WO | 2018/051731 A1 | 3/2018 |

OTHER PUBLICATIONS

International Preliminary Report on Patentability issued in PCT/JP2019/028843; completed Apr. 7, 2020.
An Office Action mailed by China National Intellectual Property Administration dated Jul. 27, 2021, which corresponds to Chinese Patent Application No. 201980047139.2 and is related to U.S. Appl. No. 17/133,699; with English language translation.

* cited by examiner

FIG. 15

| TEMPERATURE OF IMAGING LENS [°C] | TEMPERATURE OF IMAGE CAPTURING DEVICE MAIN BODY [°C] |
|---|---|
| 25 | 28 |
| 30 | 40 |
| 35 | 50 |
| 40 | 60 |
| 45 | 65 |
| 50 | 70 |
| 55 | 75 |

FIG. 16

| ELAPSED TIME [sec] | CHANGE AMOUNT IN TEMPERATURE OF IMAGING LENS [°C] |
|---|---|
| 0 | 0 |
| 10 | $A1 \times X + B1$ |
| 30 | $A2 \times X + B2$ |
| 100 | $A3 \times X + B3$ |
| 250 | $A3 \times X + B3$ |
| 500 | $A3 \times X^2 + B3$ |
| 1000 | $A3 \times X^2 + B3$ |

IMAGE CAPTURING DEVICE, IMAGE CAPTURING METHOD, AND PROGRAM

CROSS-REFERENCE TO RELATED APPLICATIONS

This application is a Continuation of PCT International Application No. PCT/JP2019/028843 filed on Jul. 23, 2019, which claims priority under 35 U.S.C. § 119(a) to Japanese Patent Application No. 2018-161647 filed on Aug. 30, 2018 and Japanese Patent Application No. 2018-220605 filed on Nov. 26, 2018. Each of the above application(s) is hereby expressly incorporated by reference, in its entirety, into the present application.

BACKGROUND OF THE INVENTION

1. Field of the Invention

The present disclosure relates to an image capturing device, an image capturing method, and a program.

2. Description of the Related Art

In related art, for camera shake correction, there is known an image capturing device having a shake correction function in both of an imaging lens and an image capturing device main body.

As a technique related to such an image capturing device, there is disclosed an image capturing device that calculates a difference between an average value of angular velocities detected by an angular velocity sensor included in an imaging lens within a certain period and an average value of angular velocities detected by an angular velocity sensor included in an image capturing device main body within a certain period (refer to JP2016-114792A). The image capturing device improves a detection accuracy of the angular velocity sensor having a lower detection accuracy by subtracting the calculated difference from the angular velocity detected by the angular velocity sensor having the lower detection accuracy between the two angular velocity sensors.

Further, there is disclosed an image capturing device that corrects a low frequency portion of a shake amount of an image shake by using a shake correction function of an image capturing device main body and corrects a high frequency portion of the shake amount of the image shake by using a shake correction function of an imaging lens (refer to JP2015-194711A).

SUMMARY OF THE INVENTION

On the other hand, in a case where correction of an image shake is performed, there is a case where the shake cannot be accurately corrected depending on a temperature of the image capturing device main body and a temperature of the imaging lens. The reason is that, for example, a detection accuracy of a detection unit that detects a shake amount of the image shake may decrease depending on the temperature.

However, in the techniques described in JP2016-114792A and JP2015-194711A, it is not considered to calculate a correction amount in a case where correction of the image shake is performed, according to the temperature of the image capturing device main body and the temperature of the imaging lens. As a result, there is a case where the shake cannot be accurately corrected.

The present disclosure has been made in consideration of the above circumstances, and an object of the present disclosure is to provide an image capturing device, an image capturing method, and a program capable of accurately correcting a shake.

In order to achieve the above object, according to an aspect of the present disclosure, there is provided an image capturing device including: an imaging lens; an image capturing device main body including an imaging element that captures an optical image transmitting through the imaging lens; a first correction unit that performs correction of an image shake by a correction lens; a second correction unit that performs correction of the image shake by the image capturing device main body; a control unit that performs a control of causing the first correction unit and the second correction unit to share and correct the image shake; and a calculation unit that calculates a correction amount of each of the first correction unit and the second correction unit according to at least one of a temperature of the imaging lens or a temperature of the image capturing device main body in a case where correction of the image shake is performed by the first correction unit and the second correction unit.

In the image capturing device according to the aspect of the present disclosure, the calculation unit may calculate the correction amount according to at least one of a deviation amount of the temperature of the imaging lens from a reference temperature or a deviation amount of the temperature of the image capturing device main body from a reference temperature.

Further, in the image capturing device according to the aspect of the present disclosure, the control unit may set a share ratio of correction of the image shake by one of the first correction unit and the second correction unit corresponding to one of the imaging lens and the image capturing device main body having a smaller deviation amount to be higher than a share ratio of correction of the image shake by the other of the first correction unit and the second correction unit.

Further, in the image capturing device according to the aspect of the present disclosure, the calculation unit may calculate the correction amount for each of frequency bands in which shake amounts of the image shake are different from each other.

Further, in the image capturing device according to the aspect of the present disclosure, the control unit may set a share ratio of correction of the image shake by the first correction unit or the second correction unit corresponding to one of the imaging lens and the image capturing device main body having a smaller deviation amount to be higher as the frequency band has a lower frequency.

Further, in the image capturing device according to the aspect of the present disclosure, the control unit may include a first control unit that is provided in the imaging lens and controls the first correction unit and a second control unit that is provided in the image capturing device main body and controls the second correction unit.

Further, the image capturing device according to the aspect of the present disclosure may further include at least one of a first measurement unit that is provided in the imaging lens and measures the temperature of the imaging lens or a second measurement unit that is provided in the image capturing device main body and measures the temperature of the image capturing device main body.

On the other hand, in order to achieve the above object, according to another aspect of the present disclosure, there is provided an image capturing method performed by an image capturing device including an imaging lens, an image capturing device main body including an imaging element that captures an optical image transmitting through the imaging lens, a first correction unit that performs correction of an image shake by a correction lens, and a second correction unit that performs correction of the image shake by the image capturing device main body, the method including: performing a control of causing the first correction unit and the second correction unit to share and correct an image shake; and calculating a correction amount of each of the first correction unit and the second correction unit according to at least one of a temperature of the imaging lens or a temperature of the image capturing device main body in a case where correction of the image shake is performed by the first correction unit and the second correction unit.

Further, in order to achieve the above object, according to still another aspect of the present disclosure, there is provided a program for causing a computer controlling an image capturing device to execute a process, the image capturing device including an imaging lens, an image capturing device main body including an imaging element that captures an optical image transmitting through the imaging lens, a first correction unit that performs correction of an image shake by a correction lens, and a second correction unit that performs correction of the image shake by the image capturing device main body, the process including: performing a control of causing the first correction unit and the second correction unit to share and correct an image shake; and calculating a correction amount of each of the first correction unit and the second correction unit according to at least one of a temperature of the imaging lens or a temperature of the image capturing device main body in a case where correction of the image shake is performed by the first correction unit and the second correction unit.

Further, according to still another aspect of the present disclosure, there is provided an image capturing device including: an imaging lens; an image capturing device main body including an imaging element that captures an optical image transmitting through the imaging lens; a first correction unit that performs correction of an image shake by a correction lens; a second correction unit that performs correction of the image shake by the image capturing device main body; a memory that stores a command to be executed by a computer; and a processor configured to execute the stored command, in which the processor performs a control of causing the first correction unit and the second correction unit to share and correct the image shake and calculates a correction amount of each of the first correction unit and the second correction unit according to at least one of a temperature of the imaging lens or a temperature of the image capturing device main body in a case where correction of the image shake is performed by the first correction unit and the second correction unit.

According to the present disclosure, it is possible to accurately correct a shake.

BRIEF DESCRIPTION OF THE DRAWINGS

FIG. 15 is a diagram illustrating an example of a table representing a correspondence relationship between the temperature of the image capturing device main body and the temperature of the imaging lens.

FIG. 16 is a diagram illustrating an example of a table representing a correspondence relationship between the temperature of the image capturing device main body and the temperature of the imaging lens.

DESCRIPTION OF THE PREFERRED EMBODIMENTS

Hereinafter, an example of an embodiment for performing a technique according to the present disclosure will be described in detail with reference to the drawings. In the following, shake correction by an imaging lens is referred to as optical image stabilizer (OIS), and shake correction by an image capturing device main body is referred to as body image stabilizer (BIS).

First Embodiment

Figure 1:
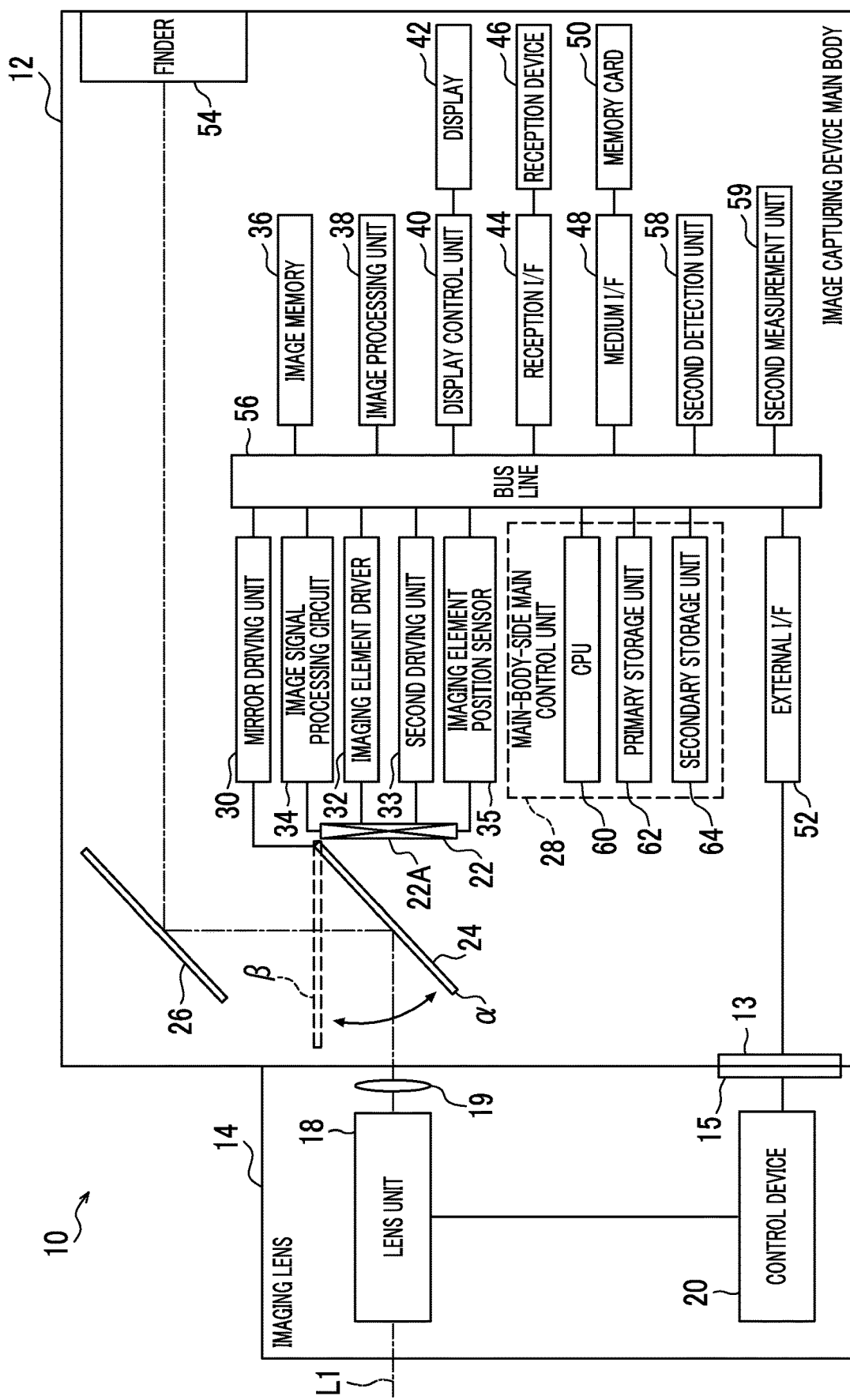
FIG. 1 is a block diagram illustrating an example of a hardware configuration of an image capturing device according to each embodiment.

Next, a configuration of an image capturing device 10 according to the present embodiment will be described with reference to FIGS. 1 and 2. As illustrated in FIG. 1, the image capturing device 10 is a lens interchangeable type digital camera, and includes an image capturing device main body 12 and an imaging lens 14. The imaging lens 14 is interchangeably attached to the image capturing device main body 12.

The image capturing device 10 according to the present embodiment has a still image capturing mode and a moving image capturing mode as operation modes of an image capturing system. The still image capturing mode is an operation mode for recording a still image obtained by capturing an image of a subject, and the moving image capturing mode is an operation mode for recording a moving image obtained by capturing an image of a subject.

In the image capturing device 10, the still image capturing mode and the moving image capturing mode are selectively set according to an instruction which is input to the image capturing device 10 by a user. In the still image capturing mode, a manual focus mode and an auto focus mode are selectively set according to an instruction which is input to the image capturing device 10 by a user. In the following, auto focus is referred to as "auto focus (AF)".

In the AF mode, an image capturing condition is adjusted by half pressing a release button (not illustrated) provided in the image capturing device main body 12, and then main exposure is performed in a case where the release button is continuously and fully pressed. In other words, in a case where the release button is half pressed, an auto exposure (AE) function is enabled and an exposure state is set. Then, an AF function is enabled and a focus control is performed. In this state, in a case where the release button is fully pressed, image capturing is performed.

The image capturing device main body 12 includes a mount 13, and the imaging lens 14 includes a mount 15. The mount 15 is coupled to the mount 13, and thus the imaging lens 14 is interchangeably attached to the image capturing device main body 12. The imaging lens 14 includes a lens unit 18, a diaphragm 19, and a control device 20. The diaphragm 19 is provided closer to the image capturing device main body 12 than the lens unit 18, adjusts a light amount of subject light transmitting through the lens unit 18, and guides the subject light into the image capturing device main body 12. The control device 20 is electrically connected to the image capturing device main body 12 via the mounts 13 and 15, and controls the entire imaging lens 14 according to an instruction from the image capturing device main body 12.

The image capturing device main body 12 includes an imaging element 22, a first mirror 24, a second mirror 26, a main-body-side main control unit 28, a mirror driving unit 30, an imaging element driver 32, an image signal processing circuit 34, an image memory 36, an image processing unit 38, a display control unit 40, and a display 42. The image capturing device main body 12 further includes a reception interface (I/F) 44, a reception device 46, a medium I/F 48, a memory card 50, an external I/F 52, and a finder 54. The image capturing device main body 12 further includes a second driving unit 33, an imaging element position sensor 35, a second detection unit 58, and a second measurement unit 59. The imaging element 22 is an example of an imaging element that captures an optical image transmitting through the imaging lens 14.

The main-body-side main control unit 28 is an example of a computer controlling the image capturing device 10, and includes a central processing unit (CPU) 60, a primary storage unit 62, and a secondary storage unit 64.

The CPU 60 controls the entire image capturing device 10. The primary storage unit 62 is a volatile memory used as a work area or the like in execution of various programs. As an example of the primary storage unit 62, a random access memory (RAM) may be used. The secondary storage unit 64 is a non-volatile memory that stores various programs and various parameters in advance. As an example of the secondary storage unit 64, a flash memory may be used.

The CPU 60, the primary storage unit 62, and the secondary storage unit 64 are connected to a bus line 56. Further, the mirror driving unit 30, the imaging element driver 32, the image signal processing circuit 34, the image memory 36, the image processing unit 38, the display control unit 40, the reception I/F 44, the medium I/F 48, and the external I/F 52 are also connected to the bus line 56. Further, the second driving unit 33, the imaging element position sensor 35, the second detection unit 58, and the second measurement unit 59 are also connected to the bus line 56.

The first mirror 24 is a movable mirror that is interposed between a light receiving surface 22A of the imaging element 22 and the lens unit 18 and is movable between a light-receiving-surface covering position α and a light-receiving-surface open position β. The first mirror 24 is connected to the mirror driving unit 30, and the mirror driving unit 30 selectively disposes the first mirror 24 at the light-receiving-surface covering position α and the light-receiving-surface open position β by driving the first mirror 24 under a control of the CPU 60. That is, the first mirror 24 is disposed at the light-receiving-surface covering position α by the mirror driving unit 30 in a case where subject light is not received to the light receiving surface 22A, and the first mirror 24 is disposed at the light-receiving-surface open position β by the mirror driving unit 30 in a case where subject light is received to the light receiving surface 22A.

At the light-receiving-surface covering position α, the first mirror 24 covers the light receiving surface 22A, and reflects subject light guided from the lens unit 18 and guides the reflected subject light to the second mirror 26. The second mirror 26 reflects the subject light guided from the first mirror 24, and guides the reflected subject light to the finder 54 via an optical system (not illustrated). The finder 54 transmits the subject light guided by the second mirror 26. At the light-receiving-surface open position β, a state where the light receiving surface 22A is covered by the first mirror 24 is released, and the subject light is received by the light receiving surface 22A without being reflected by the first mirror 24.

The imaging element driver 32 is connected to the imaging element 22, and supplies a driving pulse to the imaging element 22 under a control of the CPU 60. Each pixel of the imaging element 22 is driven according to the driving pulse supplied by the imaging element driver 32. In the present embodiment, as the imaging element 22, a charge coupled device (CCD) image sensor is used. On the other hand, the technique according to the present disclosure is not limited thereto, and for example, other image sensors such as a complementary metal oxide semiconductor (CMOS) image sensor may be used.

The image signal processing circuit 34 reads an image signal for one frame from the imaging element 22 for each pixel under a control of the CPU 60. The image signal processing circuit 34 performs, on the read image signal, various processing such as sampling two correlation pile processing, automatic gain adjustment, and A/D conversion. The image signal processing circuit 34 outputs, a digital image signal obtained by performing various processing on the image signal, to the image memory 36, for each frame at a predetermined frame rate (for example, several tens of frames/seconds) defined by a clock signal supplied from the CPU 60. The image memory 36 temporarily holds the image signal which is input from the image signal processing circuit 34.

The image processing unit 38 acquires the image signal from the image memory 36 for each frame at a predetermined frame rate, and performs, on the acquired image signal, various processing such as gamma correction, brightness and chroma conversion, and compression processing. Further, the image processing unit 38 outputs, to the display control unit 40, the image signal obtained by performing various processing for each frame at a predetermined frame rate. Further, the image processing unit 38 outputs, to the CPU 60, the image signal obtained by performing various processing, according to a request from the CPU 60.

The display control unit 40 is connected to the display 42, and controls the display 42 under a control of the CPU 60. Further, the display control unit 40 outputs, to the display 42, the image signal which is input from the image processing unit 38 for each frame at a predetermined frame rate. The display 42 displays, as a live view image, an image represented by the image signal which is input from the display control unit 40 at a predetermined frame rate. The display 42 also displays a still image that is a single frame image obtained by capturing an image in a single frame. In addition to the live view image, the display 42 also displays a menu screen and the like.

The reception device 46 includes a dial, a release button, a cross key, a menu key, a touch panel, and the like, which are not illustrated, and receives various instructions from the user. The reception device 46 is connected to the reception I/F 44, and outputs an instruction content signal indicating contents of a received instruction to the reception I/F 44. The reception I/F 44 outputs, to the CPU 60, the instruction content signal which is input from the reception device 46. The CPU 60 executes processing according to the instruction content signal which is input from the reception I/F 44.

The medium I/F 48 is connected to the memory card 50, and records and reads an image file to and from the memory card 50 under a control of the CPU 60. The image file which is read from the memory card 50 by the medium I/F 48 is decompressed by the image processing unit 38 under a control of the CPU 60, and is displayed on the display 42 as a reproduction image.

As the mount 15 is connected to the mount 13, the external I/F 52 is connected to the control device 20 of the imaging lens 14, and performs transmission/reception of various information between the CPU 60 and the control device 20.

The second driving unit 33 moves the imaging element 22 under a control of the CPU 60. In the present embodiment, the second driving unit 33 moves the imaging element 22 in a plane perpendicular to an optical axis L1 (for example, in an XY plane in a case where the optical axis L1 is a Z axis). Thereby, the second driving unit 33 performs image shake correction. The second driving unit 33 is an example of a second correction unit (a second correction device) that performs image shake correction in the image capturing device main body 12. The image shake correction performed by moving the imaging element 22 by the second driving unit 33 corresponds to BIS described above. The second driving unit 33 is not particularly limited as long as the second driving unit 33 is a member capable of moving the imaging element 22. For example, as the second driving unit 33, a member using a magnet and a hall element may be applied, or an actuator including a stepping motor, an ultrasonic motor, or the like may be applied.

The imaging element position sensor 35 detects a position of the imaging element 22 in the plane perpendicular to the optical axis L1. The position of the imaging element 22 detected by the imaging element position sensor 35 is used in a case where the second driving unit 33 moves the imaging element 22. The imaging element position sensor 35 is not particularly limited as long as the imaging element position sensor 35 is a sensor that can detect the position of the imaging element 22 in the plane perpendicular to the optical axis L1.

For example, as the imaging element position sensor 35, a magnetic sensor may be applied, or an optical sensor may be applied.

The second detection unit 58 is fixedly provided in the image capturing device main body 12, and detects a shake amount of the image capturing device main body 12. A detailed configuration of the second detection unit 58 will be described later.

The second measurement unit 59 measures a temperature of the image capturing device main body 12. The second measurement unit 59 according to the present embodiment is provided near the second detection unit 58, and measures a temperature near the second detection unit 58, as the temperature of the image capturing device main body 12. As an example of the second measurement unit 59, a temperature sensor such as a thermistor may be used.

Figure 2:
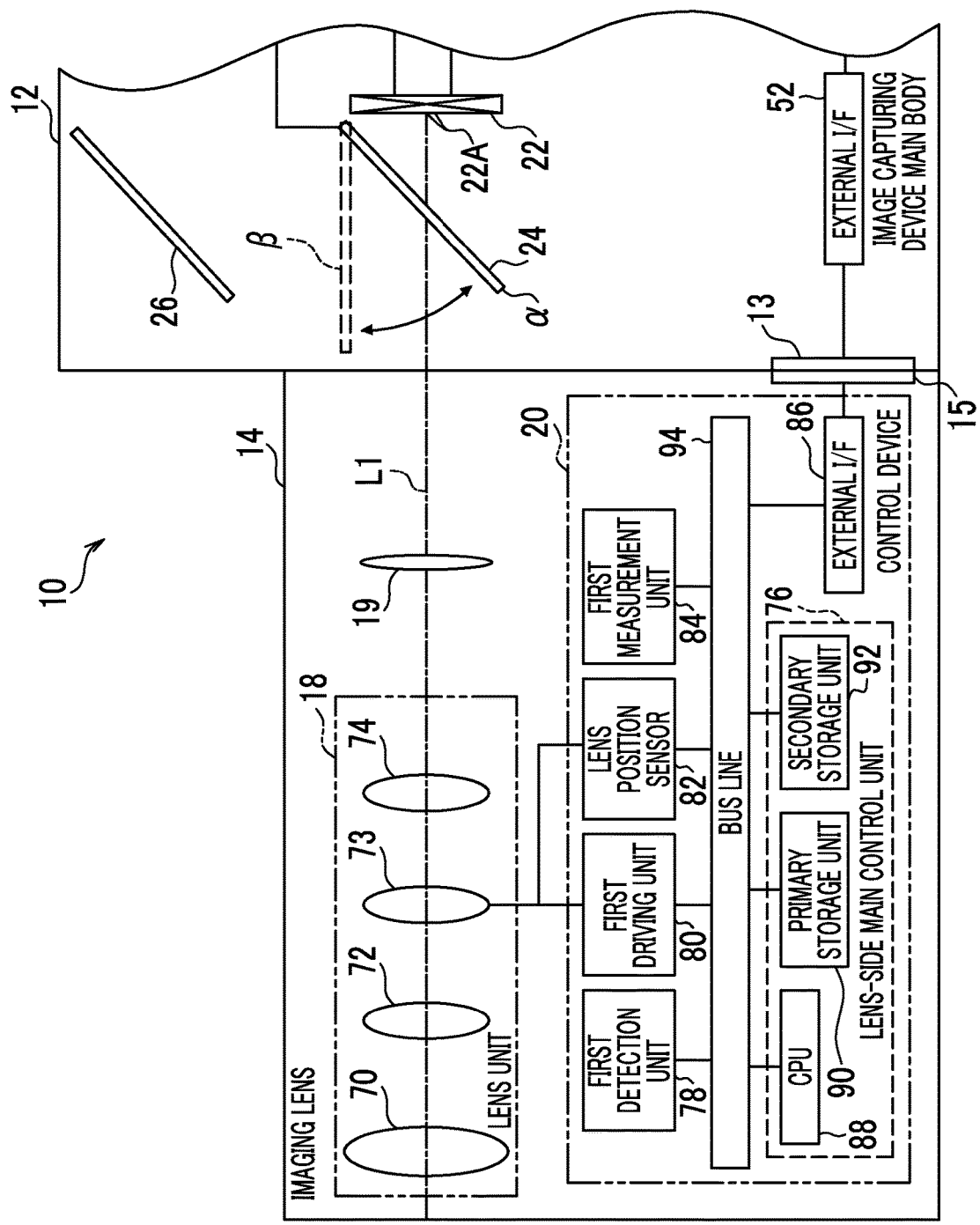
FIG. 2 is a block diagram illustrating an example of a hardware configuration of an imaging lens included in the image capturing device according to each embodiment.

As an example, as illustrated in FIG. 2, the lens unit 18 according to the present embodiment includes a light-incident lens 70, a zoom lens 72, a correction lens 73, and a focus lens 74. The light-incident lens 70, the zoom lens 72, the correction lens 73, and the focus lens 74 are provided along the optical axis L1, and the focus lens 74, the correction lens 73, the zoom lens 72, and the light-incident lens 70 are provided in this order from the diaphragm 19 along the optical axis L1.

The subject light is incident on the light-incident lens 70. The light-incident lens 70 transmits the subject light, and guides the subject light to the zoom lens 72. The zoom lens 72 according to the present embodiment includes a plurality of lenses that can move along the optical axis L1. By adjusting a state of the zoom lens 72, a focal length of the imaging lens 14 (hereinafter, simply referred to as a "focal length") is adjusted. Specifically, in the zoom lens 72, by rotating a zoom ring (not illustrated) provided in the imaging lens 14, the lenses move closer or move away to and from each other along the optical axis L1, and thus a positional relationship between the lenses along the optical axis L1 is adjusted. Therefore, the focal length is adjusted. The zoom lens 72 transmits the subject light which is incident from the light-incident lens 70, and guides the subject light to the correction lens 73.

The correction lens 73 is a lens that can move in the plane perpendicular to the optical axis L1 (for example, in the XY plane in a case where the optical axis L1 is the Z axis), and corrects an image shake by moving in the plane perpendicular to the optical axis L1. The correction lens 73 transmits the subject light which is incident from the zoom lens 72, and guides the subject light to the focus lens 74.

The focus lens 74 is a lens that can move along the optical axis L1, and changes a focus of a subject image formed on the light receiving surface 22A of the imaging element 22 by moving along the optical axis L1. In the following, a position of the focus lens 74 along the optical axis L1 is simply described as a position of the focus lens 74. The focus lens 74 transmits the subject light which is incident from the correction lens 73, and guides the subject light to the diaphragm 19. The diaphragm 19 adjusts a light amount of the subject light which is incident from the focus lens 74, transmits the subject light, and guides the subject light to the image capturing device main body 12.

The control device 20 of the imaging lens 14 includes a lens-side main control unit 76, a first detection unit 78, a first driving unit 80, a lens position sensor 82, a first measurement unit 84, and an external I/F 86.

The lens-side main control unit 76 includes a CPU 88, a primary storage unit 90, and a secondary storage unit 92. The CPU 88 controls the entire imaging lens 14. The primary storage unit 90 is a volatile memory used as a work area or the like in execution of various programs. As an example of the primary storage unit 90, a RAM may be used. The secondary storage unit 92 is a non-volatile memory that stores various programs and various parameters in advance. As an example of the secondary storage unit 92, a flash memory may be used.

The CPU 88, the primary storage unit 90, and the secondary storage unit 92 are connected to a bus line 94. Further, the first detection unit 78, the first driving unit 80, the lens position sensor 82, the first measurement unit 84, and the external I/F 86 are connected to the bus line 94.

As the mount 15 is connected to the mount 13, the external I/F 86 is connected to the external I/F 52 of the image capturing device main body 12, and performs transmission and reception of various information between the CPU 88 and the CPU 60 of the image capturing device main body 12 in cooperation with the external I/F 52.

The first detection unit 78 is fixedly provided in the imaging lens 14, and detects a shake amount of the imaging lens 14. A detailed configuration of the first detection unit 78 will be described later.

The first driving unit 80 moves the correction lens 73 under a control of the CPU 88. In the present embodiment, the first driving unit 80 moves the correction lens 73 in the plane perpendicular to the optical axis L1. Thereby, the first driving unit 80 performs image shake correction. The first driving unit 80 is an example of a first correction unit (a first correction device) that performs image shake correction in the correction lens 73. The image shake correction performed by moving the correction lens 73 by the first driving unit 80 corresponds to OIS described above. The first driving unit 80 is not particularly limited as long as the first driving unit 80 is a member that can move the correction lens 73. For example, as the first driving unit 80, a member using a magnet and a hall element may be applied, or an actuator including a stepping motor, an ultrasonic motor, or the like may be applied.

The lens position sensor 82 detects a position of the correction lens 73 in the plane perpendicular to the optical axis L1. The position of the correction lens 73 detected by the lens position sensor 82 is used in a case where the correction lens 73 is moved by the first driving unit 80. The lens position sensor 82 is not particularly limited as long as the lens position sensor 82 is a sensor that can detect the position of the correction lens 73 in the plane perpendicular to the optical axis L1. For example, as the lens position sensor 82, a magnetic sensor may be applied, or an optical sensor may be applied.

The first measurement unit 84 measures a temperature of the imaging lens 14. The first measurement unit 84 according to the present embodiment is provided near the first detection unit 78, and measures a temperature near the first detection unit 78, as the temperature of the imaging lens 14. As an example of the first measurement unit 84, a temperature sensor such as a thermistor may be used.

Figure 3:
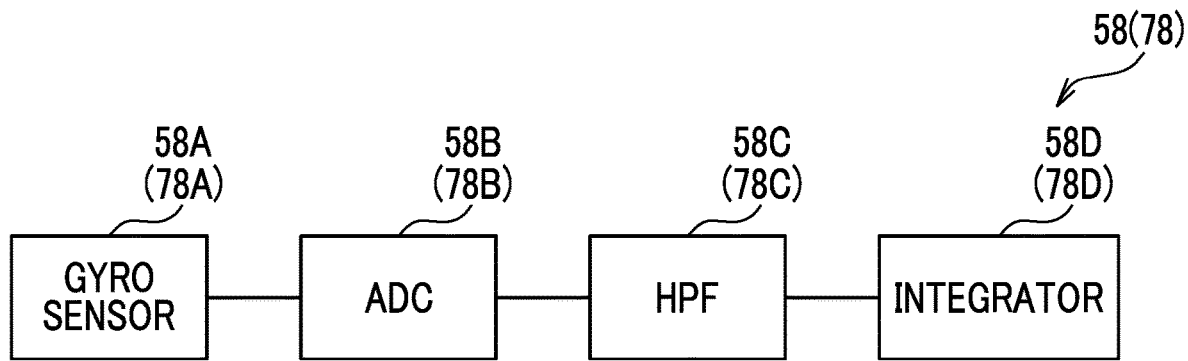
FIG. 3 is a block diagram illustrating an example of a configuration of a first detection unit and a second detection unit according to each embodiment.

Next, configurations of the first detection unit 78 and the second detection unit 58 according to the present embodiment will be described with reference to FIG. 3. As illustrated in FIG. 3, the second detection unit 58 includes a gyro sensor 58A, an analog-to-digital converter (ADC) 58B, a high pass filter (HPF) 58C, and an integrator 58D. The gyro sensor 58A detects an angular velocity [deg/sec] of the image capturing device main body 12, and outputs an analog signal indicating the detected angular velocity to the ADC 58B.

The ADC 58B converts the analog signal indicating the angular velocity which is input from the gyro sensor 58A into a digital signal, and outputs the digital signal indicating the angular velocity obtained by the conversion to the HPF 58C. The HPF 58C cuts off components having a frequency lower than a cutoff frequency and outputs components having a frequency equal to or higher than the cutoff frequency to the integrator 58D among components of the digital signal indicating the angular velocity which is input from the ADC 58B.

The integrator 58D outputs a shake amount [deg] of the image capturing device main body 12 by integrating the digital signal which is input from the HPF 58C.

Further, the first detection unit 78 includes a gyro sensor 78A, an ADC 78B, an HPF 78C, and an integrator 78D. The gyro sensor 78A, the ADC 78B, the HPF 78C, and the integrator 78D are components having the same functions as the gyro sensor 58A, the ADC 58B, the HPF 58C, and the integrator 58D, and thus descriptions thereof will be omitted.

With the above configuration, the first detection unit 78 detects a shake amount of the imaging lens 14, and the second detection unit 58 detects a shake amount of the image capturing device main body 12.

Figure 4:
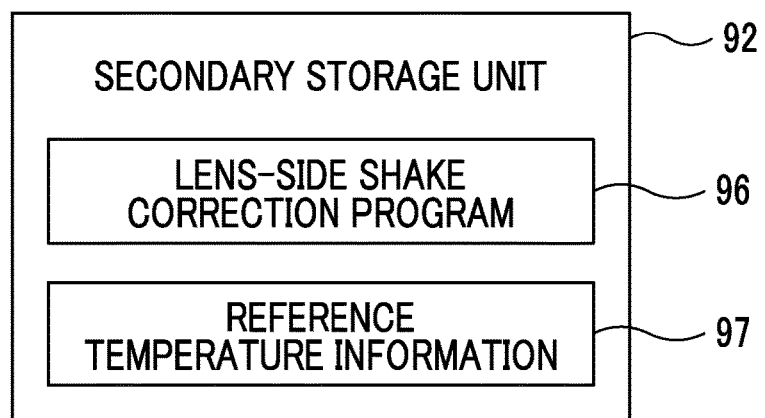
FIG. 4 is a conceptual diagram illustrating an example of storage contents of a secondary storage unit of a lens-side main control unit included in the imaging lens according to each embodiment.

As an example, as illustrated in FIG. 4, the secondary storage unit 92 of the lens-side main control unit 76 stores a lens-side shake correction program 96. The CPU 88 reads the lens-side shake correction program 96 from the secondary storage unit 92, develops the lens-side shake correction program 96 in the primary storage unit 90, and executes share ratio calculation processing (refer to FIG. 8) and shake correction processing (refer to FIG. 11) by the CPU 88, which are to be described, according to the developed lens-side shake correction program 96. In other words, the CPU 88 operates as a first control unit that controls the first driving unit 80 by executing the lens-side shake correction program 96.

Further, the secondary storage unit 92 of the lens-side main control unit 76 also stores reference temperature information 97 indicating a reference temperature of the imaging lens 14.

Figure 5:
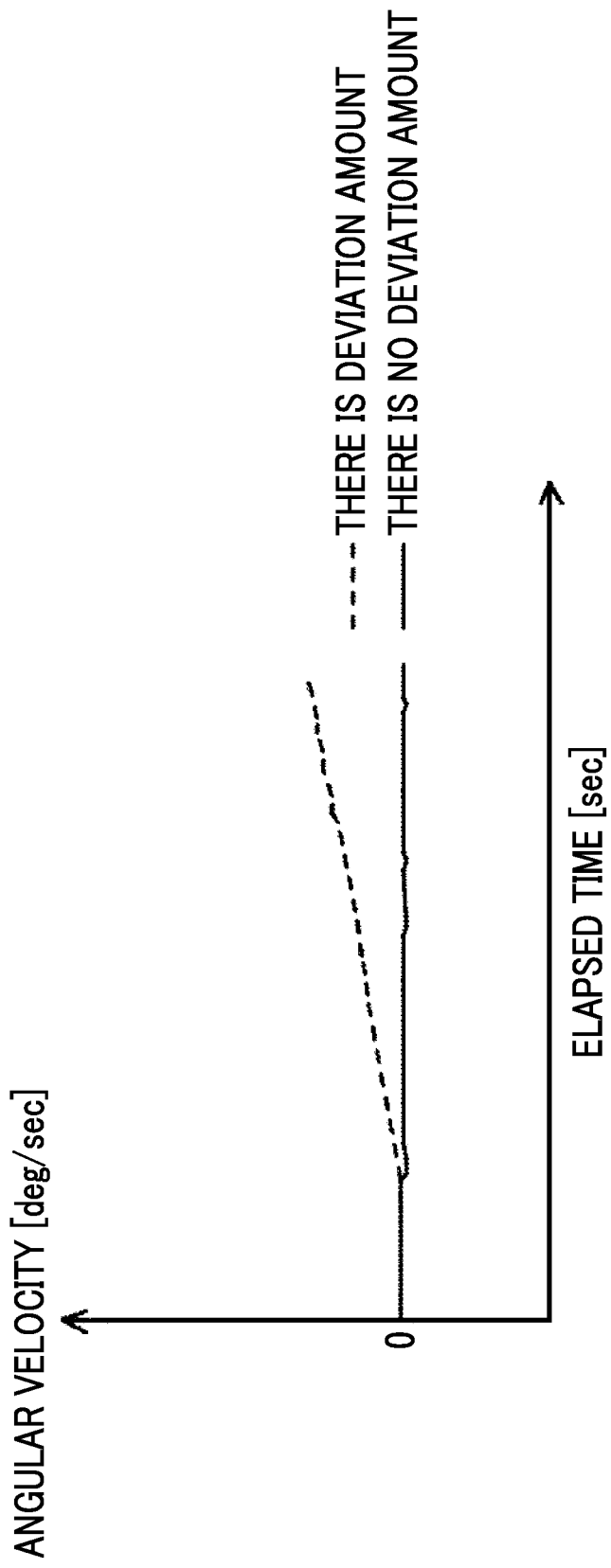
FIG. 5 is a graph illustrating an example of a time-series transition of an output from a gyro sensor according to each embodiment.

On the other hand, the gyro sensor 78A according to the present embodiment has a temperature characteristic, and thus a detection accuracy of the gyro sensor 78A is influenced by a temperature. FIG. 5 illustrates an example of a time-series transition of an output from the gyro sensor 78A in a state where the gyro sensor 78A is stationary. In FIG. 5, a vertical axis represents an angular velocity which is output from the gyro sensor 78A, and a horizontal axis represents an elapse of time. Further, in FIG. 5, a solid line illustrates a time-series transition of an output from the gyro sensor 78A in a case where a temperature measured by the first measurement unit 84 is within an appropriate temperature at which the gyro sensor 78A has a highest detection accuracy (hereinafter, simply referred to as "appropriate temperature"). Further, in FIG. 5, a broken line illustrates a time-series transition of an output from the gyro sensor 78A in a case where a temperature measured by the first measurement unit 84 deviates from the appropriate temperature.

As illustrated in FIG. 5, in a case where the temperature measured by the first measurement unit 84 is within the appropriate temperature, the output from the gyro sensor 78A in a state where the gyro sensor 78A is stationary becomes almost 0. On the other hand, in a case where the temperature measured by the first measurement unit 84 deviates from the appropriate temperature, a fluctuation amount from 0 (so-called a zero-point drift) in the output from the gyro sensor 78A in a state where the gyro sensor 78A is stationary gradually increases with the elapse of time. Further, as a deviation amount of the temperature measured by the first measurement unit 84 from the appropriate temperature increases, the fluctuation amount increases.

Figure 6:
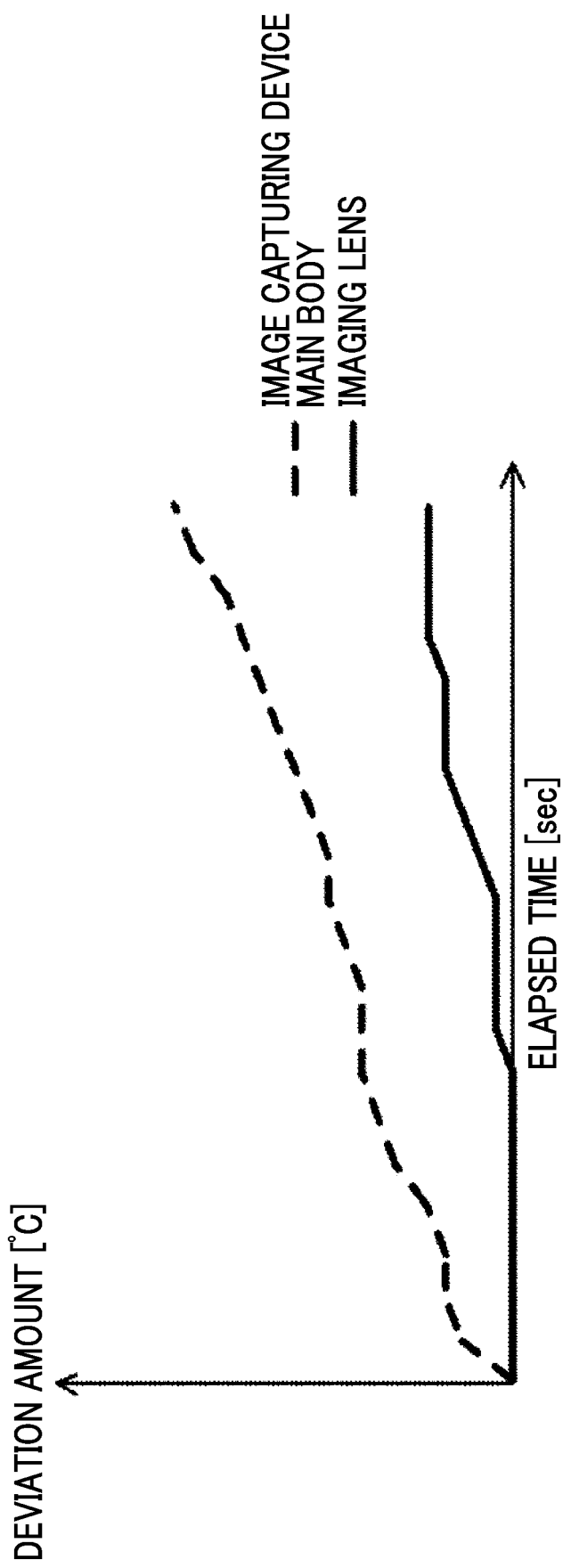
FIG. 6 is a graph illustrating an example of a time-series transition of a deviation amount from a reference temperature according to each embodiment.

Further, as illustrated in FIG. 6, as an example, in a case where the image capturing device 10 is driven, the deviation amount of the temperature of the imaging lens 14 measured by the first measurement unit 84 from the appropriate temperature increases with the elapse of time. This tendency also applies to the image capturing device main body 12. In FIG. 6, a vertical axis represents deviation amounts of the temperature of the image capturing device main body 12 and the temperature of the imaging lens 14 from the appropriate temperature, and a horizontal axis represents an elapse of time. Further, in FIG. 6, a solid line illustrates a time-series transition of the deviation amount of the temperature of the imaging lens 14 from the appropriate temperature, and a broken line illustrates a time-series transition of the deviation amount of the temperature of the image capturing device main body 12 from the appropriate temperature.

In the present embodiment, as the appropriate temperature, a temperature at which the output from the gyro sensor 78A in a state where the gyro sensor 78A is stationary is stabilized at almost 0 is obtained in advance by performing an experiment using the actual imaging lens 14. The appropriate temperature obtained in advance is set as a reference temperature of the imaging lens 14, and the reference temperature information 97 is stored in the secondary storage unit 92 of the lens-side main control unit 76.

Figure 7:
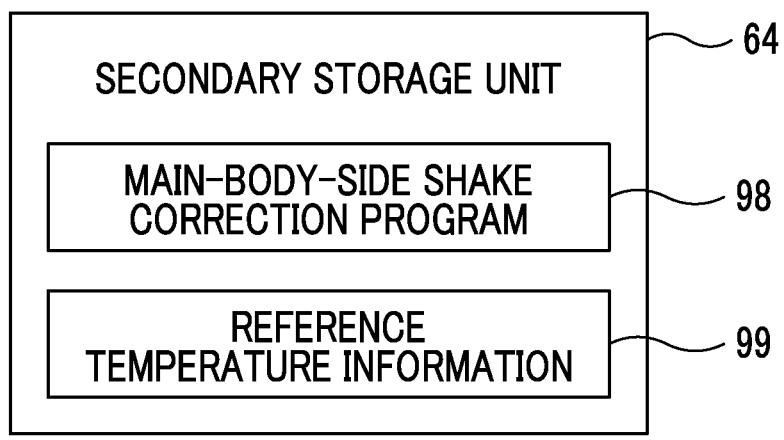
FIG. 7 is a conceptual diagram illustrating an example of storage contents of a secondary storage unit of a main-body-side main control unit included in an image capturing device main body according to each embodiment.

On the other hand, as illustrated in FIG. 7, as an example, the secondary storage unit 64 of the main-body-side main control unit 28 stores a main-body-side shake correction program 98. The CPU 60 reads the main-body-side shake correction program 98 from the secondary storage unit 64, develops the main-body-side shake correction program 98 in the primary storage unit 62, and executes share ratio calculation processing (refer to FIG. 8) and shake correction processing (refer to FIG. 11) to be described according to the developed main-body-side shake correction program 98. In other words, in a case when image shake correction is performed by the first driving unit 80 and the second driving unit 33, by executing the main-body-side shake correction program 98, the CPU 60 operates as a calculation unit that calculates correction amounts by the first driving unit 80 and the second driving unit 33 and a second control unit that controls the second driving unit 33.

Further, the secondary storage unit 64 of the main-body-side main control unit 28 also stores reference temperature information 99 indicating the reference temperature of the image capturing device main body 12.

Similar to the gyro sensor 78A, the gyro sensor 58A according to the present embodiment also has a temperature characteristic, and thus a detection accuracy of the gyro sensor 58A is influenced by a temperature. For this reason, in the present embodiment, similar to the reference temperature information 97, the appropriate temperature obtained in advance by performing an experiment using image capturing device main body 12 is set as a reference temperature of the image capturing device main body 12, and the reference temperature information 99 is stored in the secondary storage unit 64 of the main-body-side main control unit 28.

Figure 8:
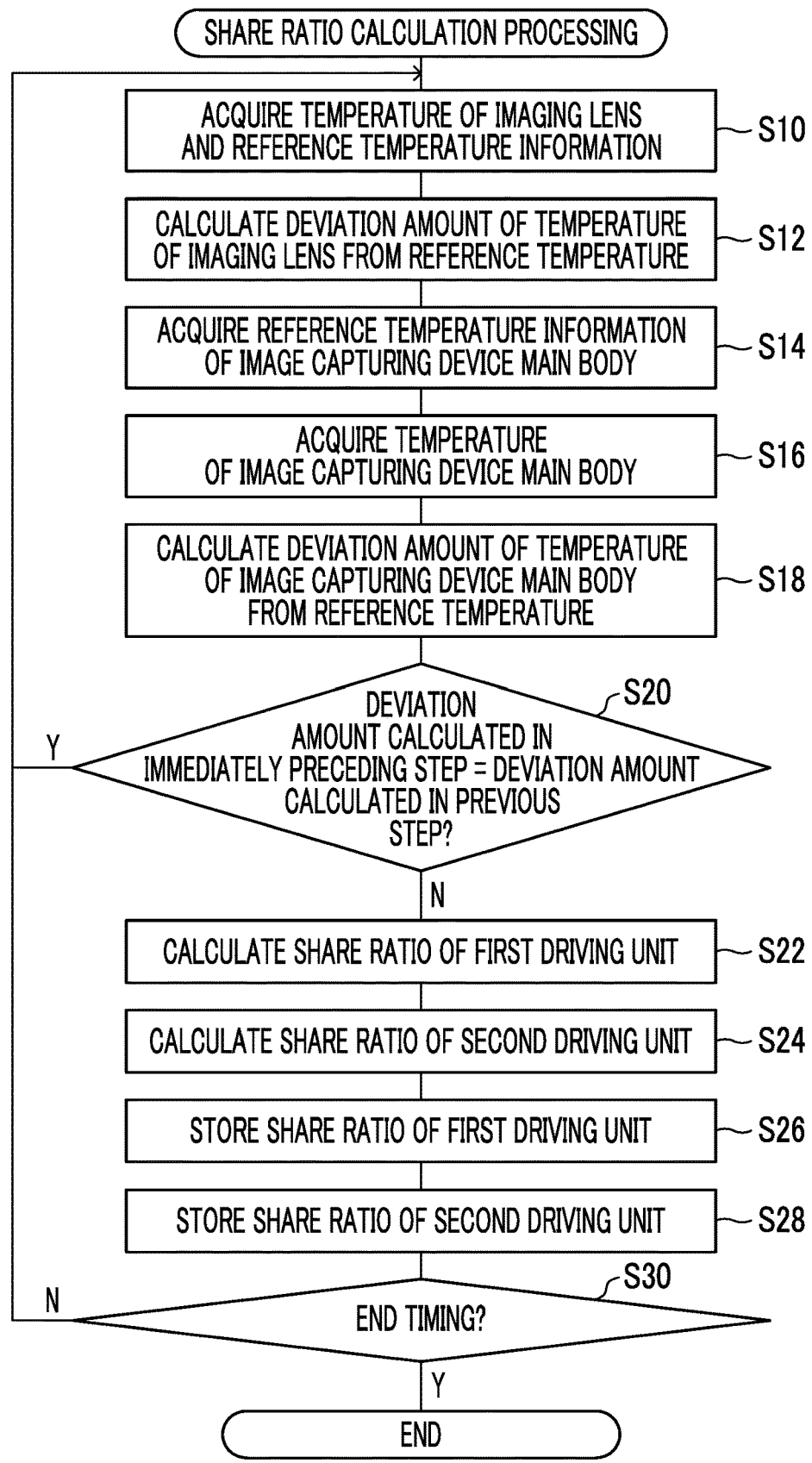
FIG. 8 is a flowchart illustrating an example of share ratio calculation processing according to each embodiment.
Figure 9:
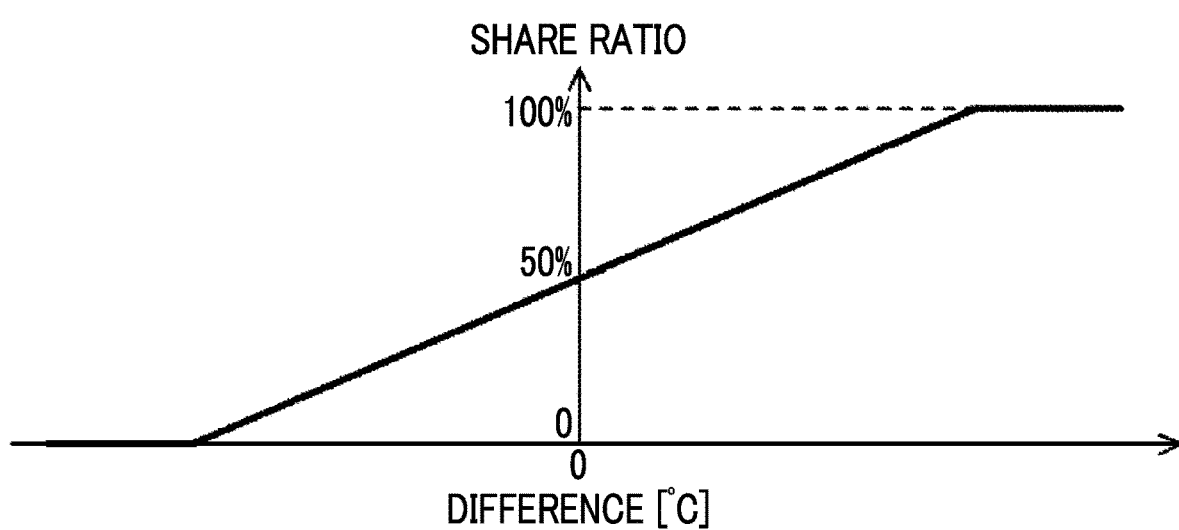
FIG. 9 is a graph for explaining share ratio calculation processing according to a first embodiment.
Figure 10:
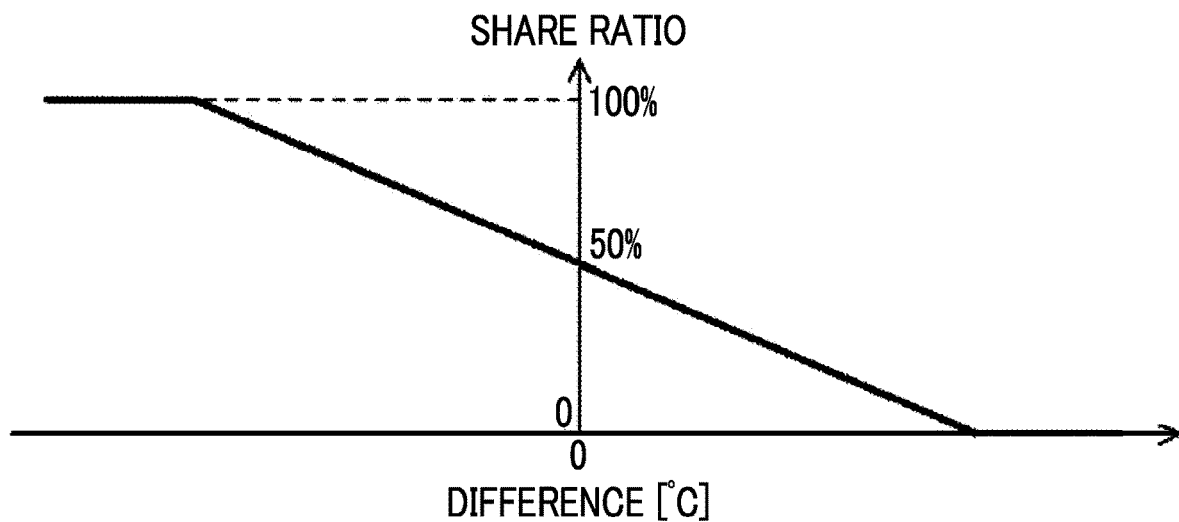
FIG. 10 is a graph for explaining share ratio calculation processing according to a modification example.
Figure 11:
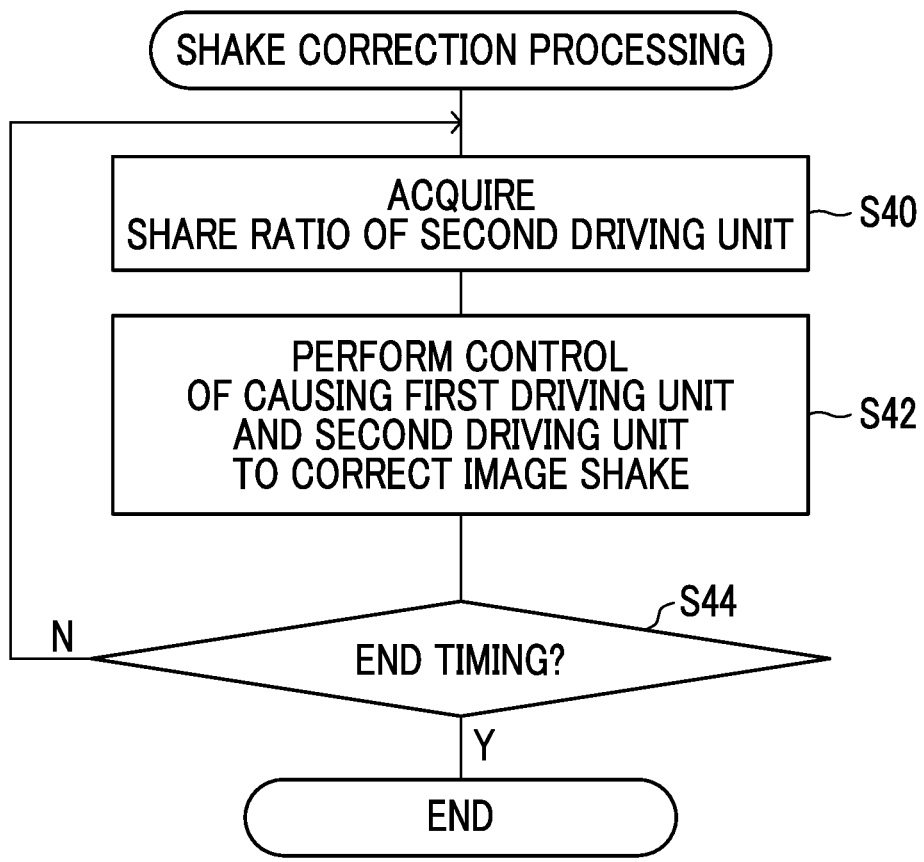
FIG. 11 is a flowchart illustrating an example of shake correction processing according to each embodiment.

Next, an operation of the image capturing device 10 according to the present embodiment will be described with reference to FIGS. 8 to 11. The share ratio calculation processing illustrated in FIG. 8 is executed, for example, in a case where a power switch of the image capturing device 10 is turned on. Further, the shake correction processing illustrated in FIG. 11 is executed, for example, in a case where a power switch of the image capturing device 10 is turned on. The shake correction processing illustrated in FIG. 11 may be executed in a case where an image capturing instruction from the user is input via the release button of the reception device 46.

In step S10 of FIG. 8, the CPU 60 acquires the temperature of the imaging lens 14 and the reference temperature information 97 via the external I/F 52. Specifically, the CPU 60 outputs, to the CPU 88, an instruction to acquire the temperature of the imaging lens 14 and the reference temperature information 97. In a case where an instruction to acquire the temperature of the imaging lens 14 and the reference temperature information 97 is input from the CPU 60, the CPU 88 acquires the temperature of the imaging lens 14 measured by the first measurement unit 84, and acquires the reference temperature information 97 from the secondary storage unit 92. Further, the CPU 88 outputs the acquired temperature of the imaging lens 14 and the reference temperature information 97 to the CPU 60 via the external I/F 86. The CPU 60 acquires the temperature of the imaging lens 14 and the reference temperature information 97 which are input from the CPU 88.

In step S12, the CPU 60 calculates an absolute value of a value obtained by subtracting the reference temperature of the imaging lens 14 indicated by the reference temperature information 97 from the temperature of the imaging lens 14 acquired in step S10. Thereby, the CPU 60 calculates a deviation amount of the temperature of the imaging lens 14 from the reference temperature. In the following, the deviation amount calculated in step S12 is referred to as a deviation amount of the imaging lens 14.

In step S14, the CPU 60 acquires the reference temperature information 99 from the secondary storage unit 64.

In step S16, the CPU 60 acquires the temperature of the image capturing device main body 12 measured by the second measurement unit 59. In step S18, the CPU 60 calculates an absolute value of a value obtained by subtracting the reference temperature of the image capturing device main body 12 indicated by the reference temperature information 99 acquired in step S14 from the temperature of the image capturing device main body 12 acquired in step S16. Thereby, the CPU 60 calculates a deviation amount of the temperature of the image capturing device main body 12 from the reference temperature. In the following, the deviation amount calculated in step S18 is referred to as a deviation amount of the image capturing device main body 12.

In step S20, the CPU 60 determines whether or not the deviation amount of the imaging lens 14 calculated in immediately preceding step S12 is equal to the deviation amount of the imaging lens 14 calculated in previous step S12 and whether or not the deviation amount of the image capturing device main body 12 calculated in immediately preceding step S18 is equal to the deviation amount of the image capturing device main body 12 calculated in previous step S18. In a case where a determination result in step S20 is Yes, the processing returns to step S10, and in a case where a determination result in step S20 is No, the processing proceeds to step S22. In other words, in a case where there is a change in at least one of the deviation amount of the imaging lens 14 or the deviation amount of the image capturing device main body 12, the processing proceeds to step S22.

In step S22, the CPU 60 calculates a share ratio in a case where image shake correction is performed by the first driving unit 80, according to the deviation amount of the imaging lens 14 and the deviation amount of the image capturing device main body 12. Specifically, the CPU 60 calculates a difference D1 of the deviation amount of the imaging lens 14 with respect to the deviation amount of the image capturing device main body 12 according to the following Equation (1).

$$D1 = \text{deviation amount of image capturing device main body 12} - \text{deviation amount of imaging lens 14} \qquad (1)$$

Further, the CPU 60 calculates the share ratio of the first driving unit 80 such that the share ratio of the first driving unit 80 becomes higher as the difference D1 becomes larger. Specifically, as an example, as illustrated in FIG. 9, the CPU 60 calculates the share ratio of the first driving unit 80 according to the difference D1, based on a calculation expression in which the share ratio of the first driving unit 80 becomes 50% when the difference D1 is 0 and the share ratio of the first driving unit 80 becomes higher as the difference D1 becomes larger. In FIG. 9, a horizontal axis represents the difference D1, and a vertical axis represents the share ratio of the first driving unit 80.

In other words, in a case where the deviation amount of the imaging lens 14 is smaller than the deviation amount of the image capturing device main body 12, the CPU 60 calculates the share ratio of the first driving unit 80 such that the share ratio of the first driving unit 80 becomes higher than the share ratio of the second driving unit 33. On the other hand, in a case where the deviation amount of the imaging lens 14 is larger than the deviation amount of the image capturing device main body 12, the CPU 60 calculates the share ratio of the first driving unit 80 such that the share ratio of the first driving unit 80 becomes lower than the share ratio of the second driving unit 33. In the example of FIG. 9, as the calculation expression, a first-order expression is used. On the other hand, in a case where the difference D1 and the share ratio can be associated with each other, a second-order function or a higher-order function may be used, a function using a logarithm may be used, or a look-up table may be used.

In step S24, the CPU 60 calculates a share ratio of the second driving unit 33 by subtracting the share ratio of the first driving unit 80 calculated in step S22 from 1 according to the following Equation (2). In Equation (2), α represents the share ratio of the first driving unit 80, and β represents the share ratio of the second driving unit 33.

$$\beta = 1 - \alpha \qquad (2)$$

In a case where image shake correction is performed by the first driving unit 80 and the second driving unit 33, by executing processing of step S22 and processing of S24, the CPU 60 operates as a calculation unit that calculates, as correction amounts by the first driving unit 80 and the second driving unit 33, the share ratios of the first driving unit 80 and the second driving unit 33.

In this way, in the present embodiment, the CPU 60 calculates the share ratio of the first driving unit 80 and then calculates the share ratio of the second driving unit 33. On the other hand, the present disclosure is not limited thereto. For example, the CPU 60 may calculate the share ratio of the second driving unit 33 and then calculate the share ratio of the first driving unit 80. In this case, a form in which the CPU 60 calculates the share ratio of the second driving unit 33 such that the share ratio of the second driving unit 33 becomes lower as the difference D1 becomes larger may be adopted. Specifically, as an example, as illustrated in FIG. 10, the CPU 60 calculates the share ratio of the second driving unit 33 according to the difference D1, based on a calculation expression in which the share ratio of the second driving unit 33 becomes 50% when the difference D1 is 0 and the share ratio of the second driving unit 33 becomes lower as the difference D1 becomes larger. In FIG. 10, a horizontal axis represents the difference D1, and a vertical axis represents the share ratio of the second driving unit 33. The CPU 60 calculates the share ratio of the first driving unit 80 by subtracting the calculated share ratio of the second driving unit 33 from 1.

In step S26, the CPU 60 stores the share ratio of the first driving unit 80 calculated in step S22 in the secondary storage unit 92 of the lens-side main control unit 76. Specifically, the CPU 60 outputs the share ratio of the first driving unit 80 to the CPU 88. In a case where the share ratio of the first driving unit 80 is input from the CPU 60, the CPU 88 stores (updates) the input share ratio of the first driving unit 80 in the secondary storage unit 92.

In step S28, the CPU 60 stores the share ratio of the second driving unit 33 calculated in step S24 in the secondary storage unit 64. In step S30, the CPU 60 determines whether or not a predetermined end timing arrives. In a case where a determination result in step S30 is No, the processing returns to step S10, and in a case where a determination result in step S30 is Yes, the share ratio calculation processing is ended. As the end timing, for example, a timing at which a power switch of the image capturing device 10 is turned off may be used.

In step S40 of FIG. 11, the CPU 60 acquires the share ratio of the second driving unit 33 stored in the secondary storage unit 64.

In step S42, the CPU 60 performs a control of causing the second driving unit 33 to correct the image shake. Specifically, the CPU 60 acquires the shake amount detected by the second detection unit 58, and multiplies the acquired shake amount by the share ratio of the second driving unit 33 acquired in step S40. The CPU 60 controls the second driving unit 33 to correct the image shake by moving the imaging element 22 so as to cancel the shake amount obtained by multiplying the share ratio of the second driving unit 33.

Further, the CPU 60 outputs an instruction to correct the image shake to the CPU 88. In a case where an instruction to correct the image shake is input from the CPU 60, the CPU 88 acquires the shake amount detected by the first detection unit 78, and acquires the share ratio of the first driving unit 80 stored in the secondary storage unit 92. Further, the CPU 88 multiplies the acquired shake amount by the acquired share ratio. The CPU 88 controls the first driving unit 80 to correct the image shake by moving the correction lens 73 so as to cancel the shake amount obtained by multiplying the share ratio of the first driving unit 80.

In step S44, the CPU 60 determines whether or not a predetermined end timing arrives. In a case where a determination result in step S44 is No, the processing returns to step S40, and in a case where a determination result in step S44 is Yes, the shake correction processing is ended. As the end timing, for example, a timing at which a power switch of the image capturing device 10 is turned off may be used. Further, as the end timing, for example, a timing at which shake correction is performed and image capturing is ended after an image capturing instruction from a user is input may be used.

As described above, according to the present embodiment, the CPU 60 calculates the share ratios of the first driving unit 80 and the second driving unit 33 in a case where image shake correction is performed by the first driving unit 80 and the second driving unit 33, according to the temperature of the imaging lens 14 and the temperature of the image capturing device main body 12. Accordingly, it is possible to more accurately correct a shake.

Second Embodiment

A second embodiment according to the disclosed technique will be described. A configuration of the image capturing device 10 according to the present embodiment is the same as the configuration according to the first embodiment (refer to FIGS. 1 to 3), and a description thereof will be omitted. Further, the storage contents of the secondary storage unit 92 of the lens-side main control unit 76 and the storage contents of the secondary storage unit 64 of the main-body-side main control unit 28 according to the present embodiment are the same as the storage contents according to the first embodiment (refer to FIGS. 4 and 7), and a description thereof will be omitted.

In the first embodiment, an example in which the share ratio of the first driving unit 80 and the share ratio of the second driving unit 33 are uniform in all frequency bands has been described. In the present embodiment, an example in which the share ratio of the first driving unit 80 and the share ratio of the second driving unit 33 are calculated for each of different frequency bands will be described.

An operation of the image capturing device 10 according to the present embodiment will be described with reference to FIGS. 8 and 11 to 13.

The share ratio calculation processing illustrated in FIG. 8 is different from the processing according to the first embodiment in processing of step S22 and step S24, and thus the processing of step S22 and step S24 will be described. Further, the correction processing illustrated in FIG. 11 is different from the processing according to the first embodiment in processing of step S42, and thus the processing of step S42 will be described.

In step S22 of FIG. 8, the CPU 60 calculates a share ratio of the first driving unit 80 for each of different frequency bands of the shake amount of the image shake, according to the deviation amount of the imaging lens 14 and the deviation amount of the image capturing device main body 12. In the present embodiment, the CPU 60 sets the share ratio of the first driving unit 80 or the share ratio of the second driving unit 33 to a higher ratio as the frequency band has a lower frequency, the first driving unit 80 or the second driving unit 33 corresponding to the image capturing device main body 12 or the imaging lens 14 having a smaller deviation amount from the reference temperature.

Figure 12:
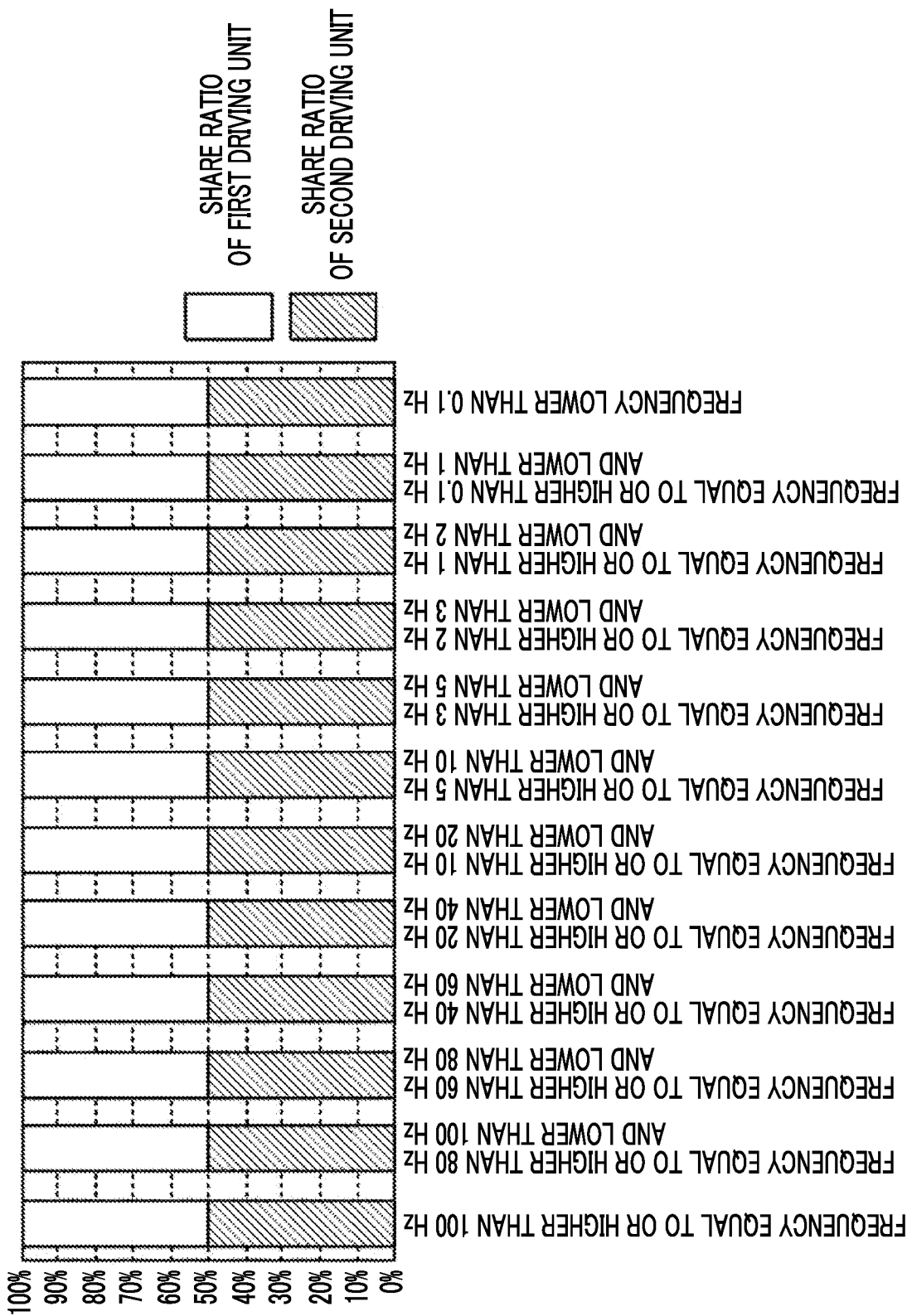
FIG. 12 is a diagram for explaining share ratio calculation processing according to a second embodiment.

Specifically, the CPU 60 calculates the difference D1 according to Equation (1). As an example, as illustrated in FIG. 12, in a case where the deviation amount of the image capturing device main body 12 and the deviation amount of the imaging lens 14 are equal (that is, in a case where the difference D1 is 0), the CPU 60 calculates the share ratio of the first driving unit 80 in each frequency band, to 50%.

Figure 13:
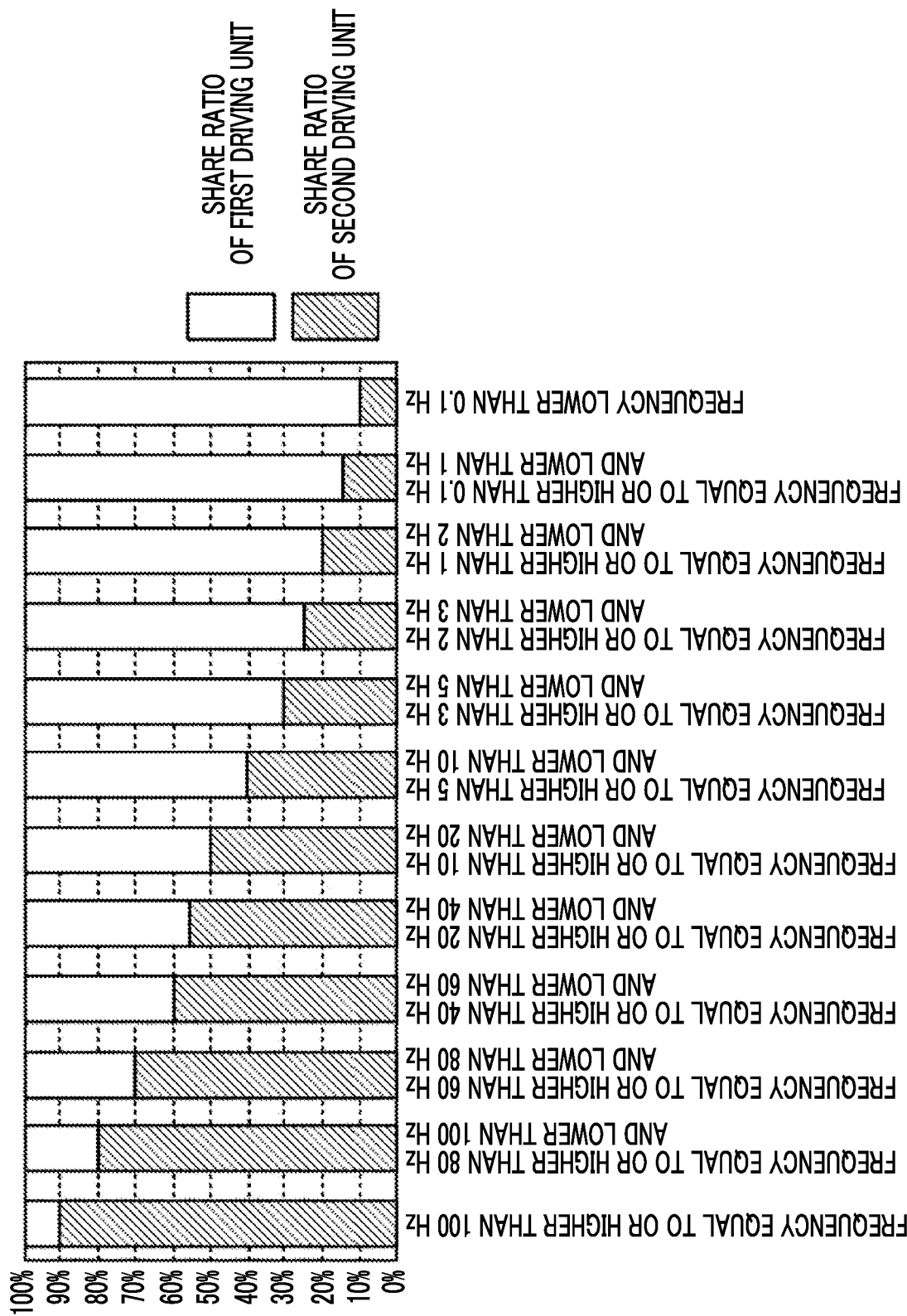
FIG. 13 is a diagram for explaining share ratio calculation processing according to the second embodiment.

Further, as an example, as illustrated in FIG. 13, in a case where the deviation amount of the imaging lens 14 is smaller than the deviation amount of the image capturing device main body 12 (that is, in a case where the difference D1 is a positive value), the CPU 60 calculates the share ratio of the first driving unit 80 to a higher ratio as the frequency band has a lower frequency. In the example of FIG. 13, the CPU 60 calculates the share ratio of the first driving unit 80 to a lowest ratio (for example, 10%) in the highest frequency band (for example, the frequency band of 100 Hz or higher), and calculates the share ratio of the first driving unit 80 to a highest ratio (for example, 90%) in the lowest frequency band (for example, the frequency band having a frequency lower than 0.1 Hz). Further, the CPU 60 calculates the share ratio of the first driving unit 80 in the frequency band between the highest frequency band and the lowest frequency band such that the share ratio becomes higher as the frequency is lower.

As the difference D1 is larger, the CPU 60 may calculate the share ratio of the first driving unit 80 in the highest frequency band to a lower share ratio and calculate the share ratio of the first driving unit 80 in the lowest frequency band to a higher share ratio. In this case, as the difference D1 is larger, the CPU 60 sets an increase degree of the share ratio of the first driving unit 80 in the frequency band between the highest frequency band and the lowest frequency, to be larger as the frequency is lower.

On the other hand, in a case where the deviation amount of the image capturing device main body 12 is smaller than the deviation amount of the imaging lens 14 (that is, in a case where the difference D1 is a negative value), the CPU 60 calculates the share ratio of the first driving unit 80 to a lower ratio as the frequency band has a lower frequency. For example, the CPU 60 calculates the share ratio of the first driving unit 80 in the highest frequency band to a highest share ratio and calculates the share ratio of the first driving unit 80 in the lowest frequency band to a lowest share ratio. Further, the CPU 60 calculates the share ratio of the first driving unit 80 in the frequency band between the highest frequency band and the lowest frequency band such that the share ratio becomes lower as the frequency is lower. As the difference D1 is smaller, the CPU 60 may calculate the share ratio of the first driving unit 80 in the highest frequency band to a higher share ratio and calculate the share ratio of the first driving unit 80 in the lowest frequency band to a lower share ratio. In this case, as the difference D1 is smaller, the CPU 60 sets a decrease degree of the share ratio of the first driving unit 80 in the frequency band between the highest frequency band and the lowest frequency band, to be larger as the frequency is lower. Further, in the present embodiment, the CPU 60 sets the share ratio of the first driving unit 80 in all the frequency bands to 50% in total.

In step S24, the CPU 60 calculates, for each frequency band, a share ratio of the second driving unit 33 by subtracting the share ratio of the first driving unit 80 calculated in step S22 from 1. Even in the present embodiment, the CPU 60 may calculate the share ratio of the second driving unit 33 and then calculate the share ratio of the first driving unit 80.

In step S42 of FIG. 11, the CPU 60 acquires the shake amount detected by the second detection unit 58, divides the acquired shake amount for each frequency band, and multiplies, for each frequency band, the shake amount by the share ratio of the second driving unit 33 acquired in step S40. Further, the CPU 60 sums up the shake amount obtained by multiplication of the share ratio of the second driving unit 33 for each frequency band. The CPU 60 controls the second driving unit 33 to correct the image shake by moving the imaging element 22 so as to cancel the shake amount obtained by summing up.

Further, the CPU 60 outputs an instruction to correct the image shake to the CPU 88. In a case where an instruction to correct the image shake is input from the CPU 60, the CPU 88 acquires the shake amount detected by the first detection unit 78, and acquires the share ratio of the first driving unit 80 stored in the secondary storage unit 92. Further, the CPU 88 divides the acquired shake amount for each frequency band, and multiplies the shake amount by the acquired share ratio for each frequency band. Further, the CPU 88 sums up the shake amount obtained by multiplication of the share ratio of the first driving unit 80 for each frequency band. The CPU 88 controls the first driving unit 80 to correct the image shake by moving the correction lens 73 so as to cancel the shake amount obtained by summing up.

As described above, according to the present embodiment, the same effect as that of the first embodiment can be obtained. Further, according to the present embodiment, the CPU 60 calculates, for each frequency band, the share ratios of the first driving unit 80 and the second driving unit 33 in a case where image shake correction is performed by the first driving unit 80 and the second driving unit 33. As the frequency is lower, the shake amount of the image shake is likely to be influenced by a temperature. Therefore, it is possible to more accurately correct a shake.

In each embodiment, a case where two control units (in the embodiment, the main-body-Side main control unit 28 and the lens-side main control unit 76) perform a control for correcting image shake in cooperation with each other has been described. On the other hand, the present disclosure is not limited thereto. For example, a form in which one control unit performs a control for correcting image shake may be adopted. In this case, a form in which the main-body-side main control unit 28 directly controls the first driving unit 80 may be adopted as an example.

Further, in each embodiment, a case where the CPU 60 executes the share ratio calculation processing illustrated in FIG. 8 and the shake correction processing illustrated in FIG. 11 and the CPU 88 performs a control for correcting the image shake according to an instruction from the CPU 60 has been described. On the other hand, the present disclosure is not limited thereto. For example, the CPU 88 may execute the share ratio calculation processing illustrated in FIG. 8 and the shake correction processing illustrated in FIG. 11, and the CPU 60 may perform a control for correcting the image shake according to an instruction from the CPU 88.

Further, in each embodiment, a case where the main-body-side main control unit 28 that controls the entire image capturing device 10 performs a control for correcting the image shake has been described. On the other hand, the present disclosure is not limited thereto. For example, a form in which a dedicated control unit for shake correction is provided in the image capturing device main body 12 separately from the main-body-side main control unit 28 and a CPU of the dedicated control unit for shake correction executes the share ratio calculation processing illustrated in FIG. 8 and the shake correction processing illustrated in FIG. 11 may be adopted.

Further, in each embodiment, a case where the shake amount detected by the first detection unit 78 is used for the image shake correction by the first driving unit 80 and the shake amount detected by the second detection unit 58 is used for the image shake correction by the second driving unit 33 has been described. On the other hand, the present disclosure is not limited thereto.

For example, a form in which the shake amount detected by the first detection unit 78 or the second detection unit 58 is used for the shake correction by any one of the first driving unit 80 and the second driving unit 33 may be adopted. In this case, a form in which the shake amount detected by any one of the first detection unit 78 and the second detection unit 58 that has the higher shake amount detection performance is used for the shake correction is adopted. In this case, it is preferable to detect a shake amount having a lower frequency, and thus it can be said that any one of the first detection unit 78 and the second detection unit 58, which includes the HPF78C or the HPF58C having the lower cutoff frequency, has a higher detection performance. Further, in general, the cutoff frequencies of the HPFs 58C and 78C are in correlation with zero-point drifts of the gyro sensors 58A and 78A. In many cases, as the zero-point drift is larger, the cutoff frequency is higher. For this reason, any one of the first detection unit 78 and the second detection unit 58, which includes the gyro sensor 78A or the gyro sensor 58A having a smaller zero-point drift, may have a higher detection performance. Here, the zero-point drift means a change amount in output of the gyro sensor 58A or 78A in a state where the gyro sensor 58A or 78A is stationary.

Further, in each embodiment, the share ratios of the first driving unit 80 and the second driving unit 33 may be calculated according to a ratio between the maximum value of the correction amount of the image shake by the first driving unit 80 and the maximum value of the correction amount of the image shake by the second driving unit 33, in addition to the temperatures of the image capturing device main body 12 and the imaging lens 14. In this case, a form in which the share ratios of the first driving unit 80 and the second driving unit 33 calculated according to the temperatures of the image capturing device main body 12 and the imaging lens 14 are multiplied by the ratio between the maximum value of the correction amount of the image shake by the first driving unit 80 and the maximum value of the correction amount of the image shake by the second driving unit 33 may be adopted.

Further, in each embodiment, a case where both of the temperature of the image capturing device main body 12 and the temperature of the imaging lens 14 are measured has been described. On the other hand, the present disclosure is not limited thereto. For example, a form in which any one of the temperature of the image capturing device main body 12 and the temperature of the imaging lens 14 is measured may be adopted. In this case, a form in which the other of the temperature of the image capturing device main body 12 and the temperature of the imaging lens 14 is assumed to be the same as the measured temperature of the image capturing device main body 12 or the imaging lens 14 may be adopted. Further, a form in which a correlation relationship between the temperature of the image capturing device main body 12 and the temperature of the imaging lens 14 is obtained in advance by an experiment and the other of the temperature of the image capturing device main body 12 and the temperature of the imaging lens 14 is estimated from any one of the temperature of the image capturing device main body 12 and the temperature of the imaging lens 14 according to the correlation relationship may be adopted. In this case, a form in which the image capturing device 10 includes any one of the first measurement unit 84 and the second measurement unit 59 may be adopted. Hereinafter, a specific example of the estimation processing will be described.

Figure 14:
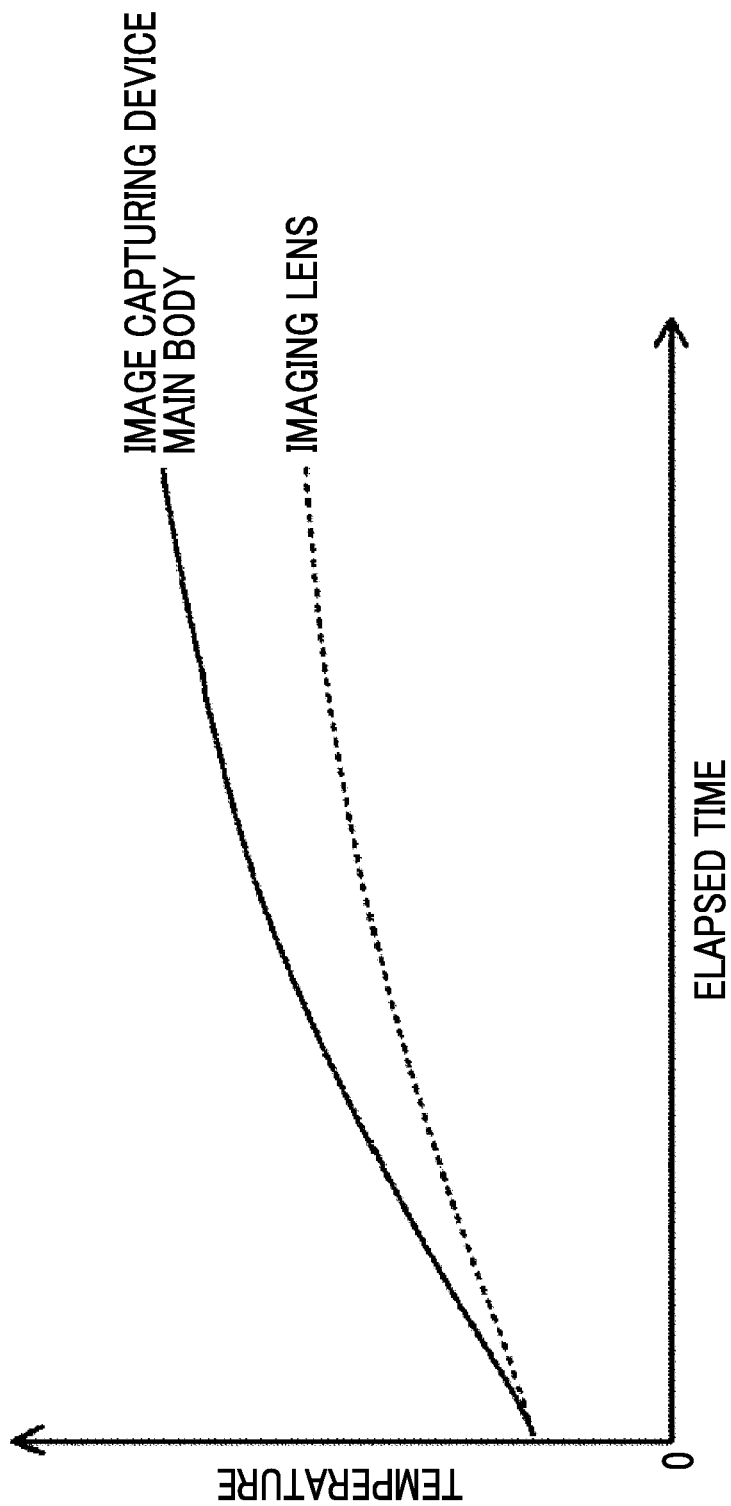
FIG. 14 is a graph illustrating an example of a time-series transition of a temperature of the image capturing device main body and a time-series transition of a temperature of the imaging lens.

First, as illustrated in FIG. 14, in a state where the imaging lens 14 is attached to the image capturing device main body 12, after the power of the image capturing device main body 12 is turned on, the temperature of the image capturing device main body 12 and the temperature of the imaging lens 14 are measured in advance. In FIG. 14, a vertical axis represents a temperature, and a horizontal axis represents an elapsed time after the power of the image capturing device main body 12 is turned on.

Next, as an example, as illustrated in FIG. 15, a table (hereinafter, referred to as a "temperature relationship table") representing a correspondence relationship between the temperature of the image capturing device main body 12 and the temperature of the imaging lens 14 is created based on the measurement results of the temperature of the image capturing device main body 12 and the temperature of the imaging lens 14. Further, the created temperature relationship table is stored in at least one of the secondary storage unit 64 or the secondary storage unit 92. For example, in the share ratio calculation processing illustrated in FIG. 8, the CPU 60 estimates the temperature of the imaging lens 14 from the temperature of the image capturing device main body 12 measured by the second measurement unit 59 by referring to the temperature relationship table. In the example of FIG. 15, for example, in a case where the temperature of the image capturing device main body 12 obtained by the measurement is 60° C., the CPU 60 estimates that the temperature of the imaging lens 14 is 40° C. The CPU 60 may estimate the temperature of the image capturing device main body 12 from the temperature of the imaging lens 14 obtained by the measurement by referring to the temperature relationship table.

FIG. 16 illustrates another example of the temperature relationship table. As illustrated in FIG. 16, in the temperature relationship table according to this example, the following calculation expression is stored corresponding to the elapsed time after the power of the image capturing device main body 12 is turned on. That is, in this case, the calculation expression for obtaining a change amount in the temperature of the imaging lens 14, in correspondence with the elapsed time, from a change amount in the temperature of the image capturing device main body 12 in a case where the temperature when the power of the image capturing device main body 12 is turned on is set as a reference is stored. The change amount in the temperature is obtained, for example, by subtracting the temperature when the power of the image capturing device main body 12 is turned on from the current temperature. Further, in FIG. 16, X represents the change amount in the temperature of the image capturing device main body 12 in a case where the temperature when the power of the image capturing device main body 12 is turned on is set as a reference, A1 to A3 represent coefficients of X, and B1 to B3 represent constants.

In the example, in the share ratio calculation processing illustrated in FIG. 8, the CPU 60 acquires the temperature of the image capturing device main body 12 measured by the second measurement unit 59. Further, the CPU 60 obtains the elapsed time from a time when the power of the image capturing device main body 12 is turned on to a time when the temperature of the image capturing device main body 12 is acquired, and the change amount in the temperature of the image capturing device main body 12 in a case where the temperature when the power of the image capturing device main body 12 is turned on is set as a reference. Further, the CPU 60 obtains the change amount in the temperature of the imaging lens 14 by referring to the temperature relationship table and substituting the obtained change amount in the temperature of the image capturing device main body 12 to the calculation expression corresponding to the obtained elapsed time. The CPU 60 estimates the temperature of the imaging lens 14 by adding the change amount in the temperature of the imaging lens 14 to the temperature of the image capturing device main body 12 when the power of the image capturing device main body 12 is turned on. In this example, the case where the temperature of the imaging lens 14 is estimated from the temperature of the image capturing device main body 12 has been described. On the other hand, similar to the example, the temperature of the image capturing device main body 12 may be estimated from the temperature of the imaging lens 14. Further, in the temperature relationship table, for example, the change amount in the temperature of the image capturing device main body 12 and the change amount in the temperature of the imaging lens 14 may be associated with each other.

Further, in each embodiment, the case where the share ratio is calculated according to the deviation amount of the temperature of the image capturing device main body 12 from the reference temperature and the deviation amount of the temperature of the imaging lens 14 from the reference temperature has been described. On the other hand, the present disclosure is not limited thereto. For example, in a case where the reference temperature of the image capturing device main body 12 and the reference temperature of the imaging lens 14 are the same, a form in which the share ratio is calculated using the temperature of the image capturing device main body 12 and the temperature of the imaging lens 14 instead of the deviation amount in each embodiment may be adopted.

Further, in each embodiment, processing parameters such as a gain, an offset, and a filter coefficient of each of the image capturing device main body 12 and the imaging lens 14 may be set to appropriate values according to the temperature of the image capturing device main body 12 and the temperature of the imaging lens 14.

Further, in each embodiment, for example, as a hardware structure of a processing unit that executes various processing such as the first control unit and the second control unit, the following various processors are may be used. The various processors include, as described above, a CPU which is a general-purpose processor that functions as various processing units by executing software (program), and a dedicated electric circuit which is a processor having a circuit configuration specifically designed to execute specific processing, such as a programmable logic device (PLD) or an application specific integrated circuit (ASIC) that is a processor of which the circuit configuration may be changed after manufacturing such as a field programmable gate array (FPGA).

One processing unit may be configured by one of these various processors, or may be configured by a combination of two or more processors of the same type or different types (for example, a combination of a plurality of FPGAs or a combination of a CPU and an FPGA). Further, the plurality of processing units may be configured by one processor.

As an example in which the plurality of processing units are configured by one processor, firstly, as represented by a computer such as a client and a server, a form in which one processor is configured by a combination of one or more CPUs and software and the processor functions as the plurality of processing units may be adopted. Secondly, as represented by a system on chip (SoC) or the like, a form in which a processor that realizes the function of the entire system including the plurality of processing units by one integrated circuit (IC) chip is used may be adopted. As described above, the various processing units are configured by using one or more various processors as a hardware structure.

Further, as the hardware structure of the various processors, more specifically, an electric circuit (circuitry) in which circuit elements such as semiconductor elements are combined may be used.

Further, in each embodiment, an example in which the main-body-side shake correction program 98 is stored (installed) in the secondary storage unit 64 in advance has been described. On the other hand, the present disclosure is not limited thereto. The main-body-side shake correction program 98 may be provided by being recorded in a recording medium such as a compact disc read only memory (CD-ROM), a digital versatile disc read only memory (DVD-ROM), or a Universal Serial Bus (USB) memory. Further, the main-body-side shake correction program 98 may be downloaded from an external device via a network.

Further, in each embodiment, an example in which the lens-side shake correction program 96 is stored (installed) in the secondary storage unit 92 in advance has been described. On the other hand, the present disclosure is not limited thereto. The lens-side shake correction program 96 may be provided by being recorded in a recording medium such as a CD-ROM, a DVD-ROM, or a USB memory. Further, the lens-side shake correction program 96 may be downloaded from an external device via a network.

EXPLANATION OF REFERENCES

10: image capturing device
12: image capturing device main body
13, 15: mount
14: imaging lens
18: lens unit
19: diaphragm
20: control device
22: imaging element
22A: light receiving surface
24: first mirror
26: second mirror
28: main-body-side main control unit
30: mirror driving unit
32: imaging element driver
33: second driving unit
34: image signal processing circuit
35: imaging element position sensor
36: image memory
38: image processing unit
40: display control unit
42: display
44: reception I/F
46: reception device
48: medium I/F
50: memory card
52, 86: external I/F
54: finder
56, 94: bus line
58: second detection unit
58A, 78A: gyro sensor
58B, 78B: ADC
58C, 78C: HPF p 58D, 78D: integrator
59: second measurement unit
60, 88: CPU
62, 90: primary storage unit
64, 92: secondary storage unit
70: light-incident lens
72: zoom lens
73: correction lens
74: focus lens
76: lens-side main control unit
78: first detection unit
80: first driving unit
82: lens position sensor
84: first measurement unit
96: lens-side shake correction program
97, 99: reference temperature information
98: main-body-side shake correction program
L1: optical axis α: light-receiving-surface covering position
β: light-receiving-surface open position

What is claimed is:

1. An image capturing device comprising:
    an imaging lens;
    an image capturing device main body including an imaging element that captures an optical image transmitting through the imaging lens;
    a first correction device that performs correction of an image shake by a correction lens;
    a second correction device that performs correction of the image shake by the image capturing device main body; and
    a processor configured to
    calculate each of correction amounts of the first correction device and the second correction device according to a temperature of the imaging lens and a temperature of the image capturing device main body and
    control the first correction device and the second correction device to share and correct the image shake with the correction amounts.

2. The image capturing device according to claim 1,
    wherein the processor is further configured to calculate the correction amount according to at least one of a first deviation amount, which is a deviation amount of the temperature of the imaging lens from a reference temperature, or a second deviation amount, which is a deviation amount of the temperature of the image capturing device main body from a reference temperature.

3. The image capturing device according to claim 2,
    wherein the processor is further configured to
    set a share ratio of correction of the image shake by the first correction device to be higher than a share ratio of correction of the image shake by the second correction device in a case where the first deviation amount is smaller than the second deviation amount,
    set a share ratio of correction of the image shake by the second correction device to be higher than a share ratio of correction of the image shake by the first correction device in a case where the second deviation amount is smaller than the first deviation amount.

4. The image capturing device according to claim 3, further comprising:
    at least one of a first measurement device that is provided in the imaging lens and measures the temperature of the imaging lens or a second measurement device that is provided in the image capturing device main body and measures the temperature of the image capturing device main body.

5. The image capturing device according to claim 2,
    wherein the processor is further configured to calculate the correction amounts in each different frequency band.

6. The image capturing device according to claim 5,
    wherein the processor is further configured to
    set a share ratio of correction of the image shake by the first correction device to be higher as the frequency band has a lower frequency in a case where the first deviation amount is smaller than the second deviation amount.

7. The image capturing device according to claim 6, further comprising:
    at least one of a first measurement device that is provided in the imaging lens and measures the temperature of the imaging lens or a second measurement device that is provided in the image capturing device main body and measures the temperature of the image capturing device main body.

8. The image capturing device according to claim 5, further comprising:
at least one of a first measurement device that is provided in the imaging lens and measures the temperature of the imaging lens or a second measurement device that is provided in the image capturing device main body and measures the temperature of the image capturing device main body.

9. The image capturing device according to claim 2, further comprising:
at least one of a first measurement device that is provided in the imaging lens and measures the temperature of the imaging lens or a second measurement device that is provided in the image capturing device main body and measures the temperature of the image capturing device main body.

10. The image capturing device according to claim 1, wherein the processor includes a first processor that is provided in the imaging lens and controls the first correction device and a second processor that is provided in the image capturing device main body and controls the second correction device.

11. The image capturing device according to claim 10, further comprising:
at least one of a first measurement device that is provided in the imaging lens and measures the temperature of the imaging lens or a second measurement device that is provided in the image capturing device main body and measures the temperature of the image capturing device main body.

12. The image capturing device according to claim 1, further comprising:
at least one of a first measurement device that is provided in the imaging lens and measures the temperature of the imaging lens or a second measurement device that is provided in the image capturing device main body and measures the temperature of the image capturing device main body.

13. An image capturing method performed by an image capturing device including an imaging lens, an image capturing device main body including an imaging element that captures an optical image transmitting through the imaging lens, a first correction unit that performs correction of an image shake by a correction lens, and a second correction unit that performs correction of the image shake by the image capturing device main body, the method comprising:
calculating each of correction amounts of the first correction device and the second correction device according to a temperature of the imaging lens and a temperature of the image capturing device main body and
controlling the first correction device and the second correction device to share and correct the image shake with the correction amounts.

14. An image capturing device comprising:
an imaging lens;
an image capturing device main body including an imaging element that captures an optical image transmitting through the imaging lens;
a first correction device that performs correction of an image shake by a correction lens;
a second correction device that performs correction of the image shake by the image capturing device main body; and
a processor configured to
set share ratios of correction of the image shake by second correction device and the image shake by the first correction device according to at least one of a temperature of the imaging lens or a temperature of the image capturing device main body;
calculate each of correction amounts of the first correction device and the second correction device according to the share ratios; and
control the first correction device and the second correction device to share and correct the image shake with the correction amounts.

15. The image capturing device according to claim 14, wherein the processor is further configured to calculate the correction amount according to at least one of a first deviation amount, which is a deviation amount of the temperature of the imaging lens from a reference temperature, or a second deviation amount, which is a deviation amount of the temperature of the image capturing device main body from a reference temperature.

16. The image capturing device according to claim 15, wherein the processor is further configured to
set a share ratio of correction of the image shake by the first correction device to be higher than a share ratio of correction of the image shake by the second correction device in a case where the first deviation amount is smaller than the second deviation amount
set a share ratio of correction of the image shake by the second correction device to be higher than a share ratio of correction of the image shake by the first correction device in a case where the second deviation amount is smaller than the first deviation amount.

17. The image capturing device according to claim 15, wherein the processor is further configured to calculate the correction amounts in each different frequency band.

18. The image capturing device according to claim 17, wherein the processor is further configured to
set a share ratio of correction of the image shake by the first correction device to be higher as the frequency band has a lower frequency in a case where the first deviation amount is smaller than the second deviation amount.

19. The image capturing device according to any one of claim 14,
wherein the processor includes a first processor that is provided in the imaging lens and controls the first correction device and a second processor that is provided in the image capturing device main body and controls the second correction device.

20. The image capturing device according to claim 14, further comprising:
at least one of a first measurement device that is provided in the imaging lens and measures the temperature of the imaging lens or a second measurement device that is provided in the image capturing device main body and measures the temperature of the image capturing device main body.

* * * * *